United States Patent [19]
Kato

[11] Patent Number: 6,032,638
[45] Date of Patent: Mar. 7, 2000

[54] FUEL INJECTION SYSTEM

[75] Inventor: Masahiko Kato, Hamamatsu, Japan

[73] Assignee: Sanshin Kogyo Kabushiki Kaisha, Hamamatsu, Japan

[21] Appl. No.: 09/131,480

[22] Filed: Aug. 10, 1998

[30] Foreign Application Priority Data

Aug. 11, 1997 [JP] Japan ..................................... 9-216841

[51] Int. Cl.[7] .............................. F20B 23/10; F20B 17/00
[52] U.S. Cl. .......................................... 123/295; 123/73 C
[58] Field of Search ............................ 123/73 C, 73 CB, 123/73 PP, 65 P, 295, 305, 303

[56] References Cited

U.S. PATENT DOCUMENTS

| | | | |
|---|---|---|---|
| 4,949,689 | 8/1990 | Schlunke | 123/73 C |
| 5,020,485 | 6/1991 | Watanabe | 123/73 C |
| 5,553,579 | 9/1996 | Yoshida et al. | 123/73 C |
| 5,762,040 | 6/1998 | Taipale et al. | 123/73 C |

*Primary Examiner*—Tony M. Argenbright
*Assistant Examiner*—Arnold Castro

*Attorney, Agent, or Firm*—Knobbe, Martens, Olson & Bear LLP

[57] ABSTRACT

A number of embodiments of direct injected V-type outboard motors provided with a very effective fuel supply system wherein the number of components can be significantly reduced as well as the elimination of many of the flexible conduits normally employed. This also permits the fuel system to be assembled as a relatively unitary assembly that can be then affixed to the engine. The arrangement is such that purging of the system from vapors during shutdowns is easily accomplished and the system can be purged without complicated construction. Furthermore, the system can be pressure tested by an arrangement where the low pressure system can bypass the high pressure system when the engine is not operating so as to be pressurized for testing purposes. However, when the high pressure system operates, then the bypass line will be closed by the shunting valve arrangement. The direct injection system permits operation with two cycle engines even under low load and speed conditions by using residual gasses to assist in fuel vaporization. The high pressure pump and its drive are also provided with a cooling system.

22 Claims, 24 Drawing Sheets

FUEL INJECTION SYSTEM

BACKGROUND OF THE INVENTION

This invention relates to a direct injection engines and more particularly to an improved direct fuel injection system for an outboard motor.

As is well known, in all fields of engine design there is an increasing emphasis on obtaining more effective emission control, better fuel economy and, at the same time, continued high or higher power output. This trend has resulted in the substitution of fuel injection systems for carburetors as the engine charge former. In order to obtain still further improvements, direct fuel injection systems are being considered. These systems inject fuel directly into the combustion chamber and thus have significant potential advantages.

With outboard motors, two cycle engines are frequently employed because of their compact nature and their high specific output. There is, however, a concern about emission from such engines. Therefore, in order to obtain the advantages of the two cycle engine, steps must be taken to insure that the combustion is clean so as to avoid the emission problems normally associated with such engines. Direct fuel injection systems are quite useful in achieving this goal.

However, there is one running condition in a two cycle engine that presents significant problems in conjunction with direct cylinder injection because of the more frequent firing impulses of such engines. This is under low speed, and low load conditions. Under these conditions, the time during which fuel is injected is relatively short, and the high pressure of the fuel injection, causes the fuel to be maintain in a liquid state in the combustion chamber during the short time period. As a result, uneven and incomplete combustion may result.

It is, therefore, a principle object of this invention to provide an improved fuel injection system for two cycle engines wherein fuel vaporization under low speed, low load conditions can be improved.

It is a further object of this invention to provide an improved fuel injection system for a two cycle engine that improves the vaporization of the fuel under low speed, low load conditions.

SUMMARY OF THE INVENTION

This invention is adapted to be embodied in a direct injection system for a two cycle internal combustion engine. The engine is comprised of a cylinder bore closed at one end by a cylinder head and at the other end by a piston reciprocating in the cylinder bore. An exhaust port and at least one scavenge port are formed in the cylinder for exhausting the burnt combustion products and for introducing a fresh air charge to the combustion chamber. A fuel injector is mounted in the cylinder head and injects fuel directly into the combustion chamber. A spark plug is mounted in the combustion chamber for firing the charge therein. The fuel injector is supplied with fuel under pressure by a fuel supply and control system. The timing of injection under low speed, low load conditions is chosen so that the fuel is injected into an area where residual combustion products reside immediately prior to ignition so as to improve fuel vaporization.

DETAILED DESCRIPTION OF THE PREFERRED EMBODIMENTS

Figure 1:
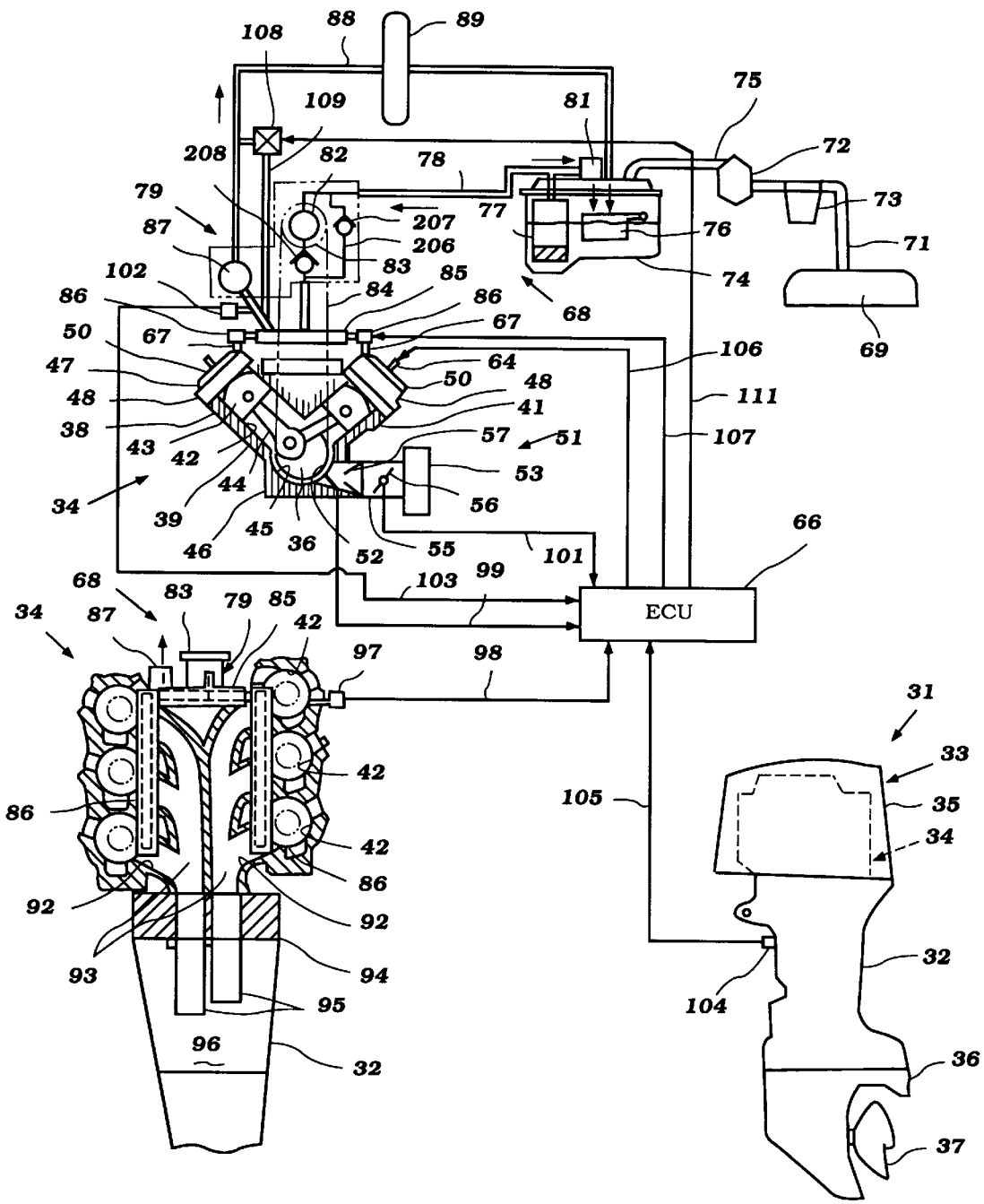
FIG. 1 is a multi-part view showing: in the lower right-hand portion, an outboard motor embodying the invention; in the lower left-hand portion, a rear elevational view of the outboard motor with portions removed and other portions broken away and shown in section so as to more clearly show the construction of the engine; and in the upper view, a partially schematic cross sectional view of the engine of the outboard motor with its induction and fuel injection system shown in part schematically. The ECU for the motor links the three views together.

The general overall environment in which the invention is practiced and certain details of the engine will be described initially by reference to FIG. 1. In the lower right hand view of this figure, an outboard motor constructed and operated in accordance with an embodiment of the invention is depicted in side elevational view and is identified generally by the reference numeral 31.

The entire outboard motor 31 is not depicted in that the swivel bracket and clamping bracket that are associated with the drive shaft housing, indicated generally by the reference numeral 32, are not illustrated. This is because these components are well known in the art and the specific method by which the outboard motor 31 is mounted to the transom of an associated watercraft is not necessary to permit those skilled in the art to understand or practice the invention.

The outboard motor 31 includes a power head, indicated generally by the reference numeral 33, that is positioned above the drive shaft housing 32 and which includes a powering internal combustion engine, indicated generally by the reference numeral 34. This engine 34 is shown in more detail in the remaining two views of this figure and will be described shortly by reference thereto.

The power head 33 is completed by a protective cowling which includes a main cowling member 35. This main cowling member 35 is detachably connected to a lower tray portion which is also not shown in this figure and which encircles an upper portion of the drive shaft housing 32.

Positioned beneath the drive shaft housing 32 is a lower unit 36 in which a propeller 37, which forms the propulsion device for the associated watercraft, is journaled.

As is typical with outboard motor practice, the engine 34 is supported in the power head 33 so that its crankshaft 36 (see the upper view) rotates about a vertically extending axis. This is done so as to facilitate connection of the crankshaft 36 to a drive shaft which depends into the drive shaft housing 32 and which drives the propeller 37 through a conventional forward, neutral, reverse transmission contained in the lower unit 36.

The details of the construction of the outboard motor and the components which are not illustrated may be considered to be conventional or of any type known to those wishing to utilize the invention disclosed herein. Those skilled in the art can readily refer to any known constructions with which to practice the invention.

Referring now in detail to the construction of the engine 34 still by primary reference to FIG. 1, in the illustrated embodiment, the engine 34 is of the V6 type and operates on a two stroke, crankcase compression principle. Although the invention is described in conjunction with an engine having this cylinder number and cylinder configuration, it will be readily apparent that the invention can be utilized with engines having other cylinder numbers and other cylinder configurations. Some features of the invention, however, have particular utility in connection with V-type engines.

Also, although the engine 34 will be described as operating on a two stroke principle, it will also be apparent to those skilled in the art that certain facets of the invention can be employed in conjunction with four stroke engine. In fact, some features of the invention also an be employed with rotary type engines.

The engine 34 is comprised of a cylinder block 38 that is formed with a pair of cylinder banks 39 and 41. Each of these cylinder banks is formed with three vertically spaced, horizontally extending cylinder bores 42. Pistons 43 reciprocate in these cylinder bores 42. The pistons 43 are, in turn, connected to the upper or small ends of connecting rods 44. The big ends of these connecting rods are journaled on the throws of the crankshaft 36 in a manner that is well known in this art.

The crankshaft 36 is journaled in a suitable manner for rotation within a crankcase chamber 45 that is formed in part by a crankcase member 46 that is affixed to the cylinder block 38 in a suitable manner. As is typical with two cycle engines, the crankshaft 36 and crankcase chamber 45 are formed with seals so that each section of the crankcase that is associated with one of the cylinder bores 42 will be sealed from the others. This type of construction is well known in the art.

A cylinder head assembly, indicated generally by the reference numeral 47, is affixed to the end of each of the cylinder banks 39 and 41 that are spaced from the crank case chamber 45. These cylinder head assemblies 47 are shown in more detail in FIG. 2 and are comprised of a main cylinder head member 48 that defines a plurality of recesses 49 in its lower face. Each of these recesses 49 cooperate with the respective cylinder bore 42 and the head of the piston 43 to define the combustion chambers of the engine. When the pistons 43 are at their top dead center position, the cylinder head recesses 49 form the major portion of the combustion chamber. For that reason, the reference numeral 49 will be used, at times, to identify the combustion chamber per se.

A cylinder head cover member 50 completes the cylinder head assembly. The cylinder head members 48 and 50 are affixed to each other and to the respective cylinder banks 39 and 41 in a suitable, known manner.

Referring again primarily to FIG. 1, an air induction system, indicated generally by the reference numeral 51 is provided for delivering an air charge to the sections of the crankcase chamber 46 associated with each of the cylinder bores 42. This communication is via an intake port 52 formed in the crankcase member 46 and registering with each such crankcase chamber section.

Figure 4:
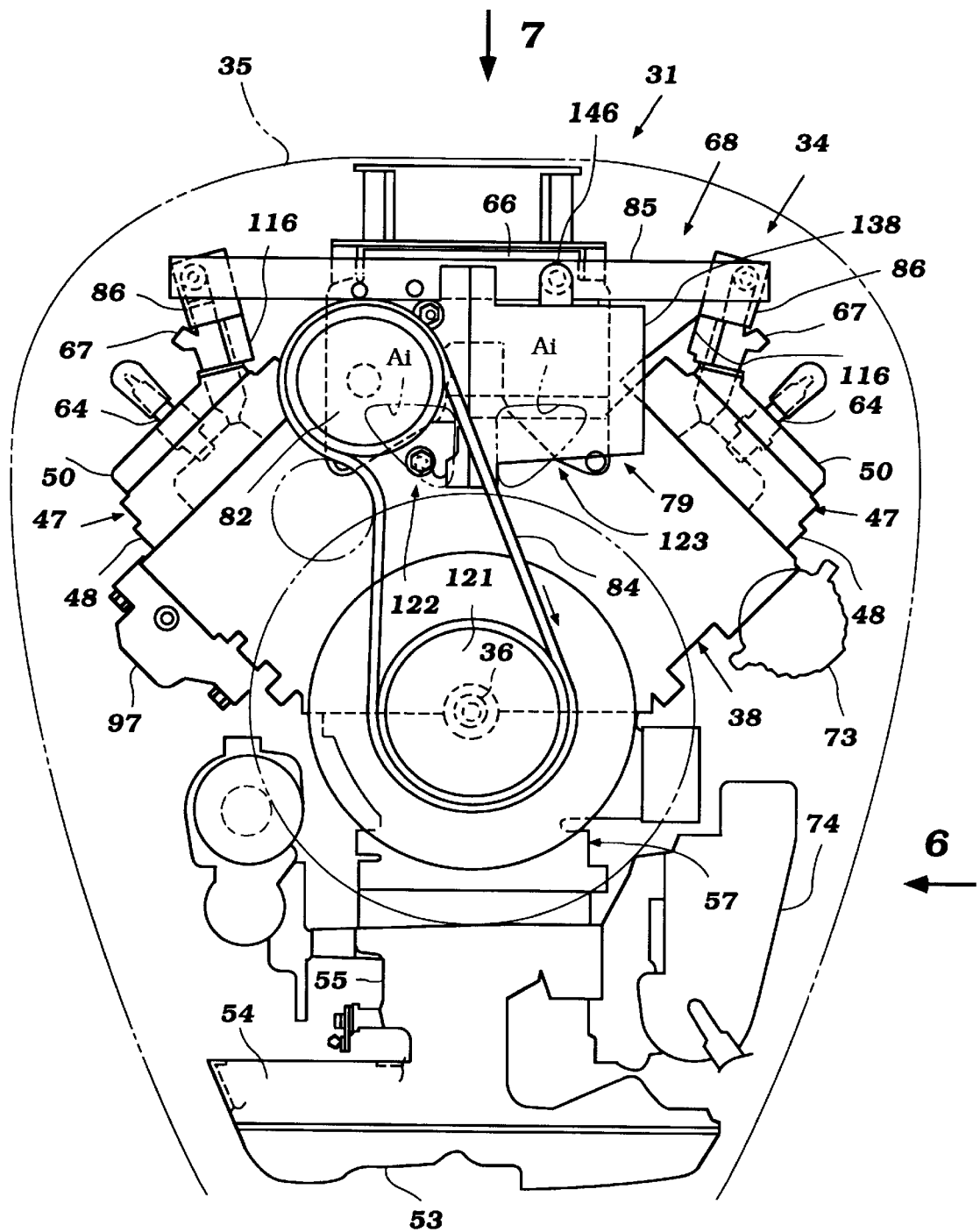
FIG. 4 is a top plan view of the power head showing the engine in solid lines and the protective cowling in phantom.
Figure 6:
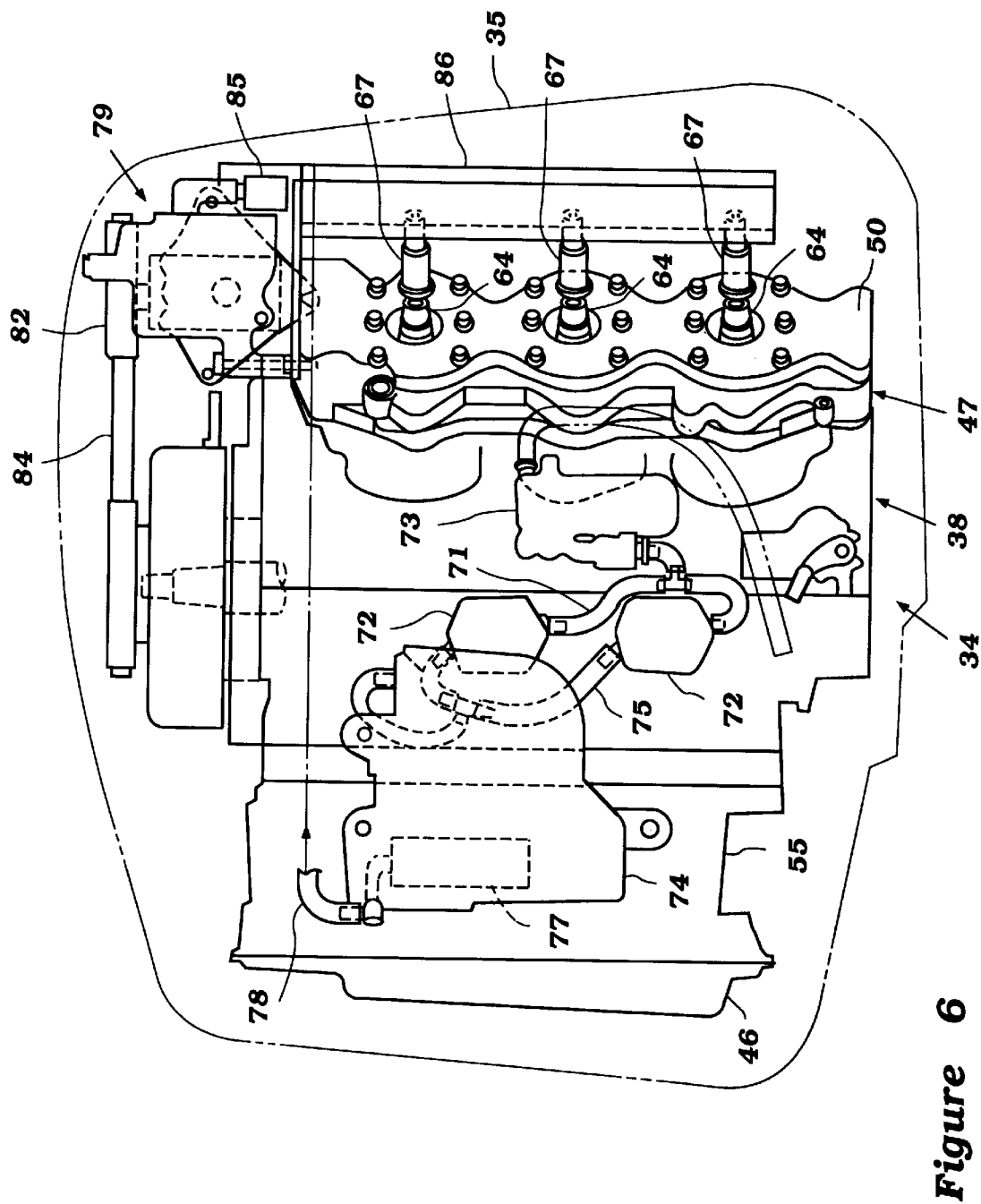
FIG. 6 is a side elevational view of the power head showing the engine in solid lines and the protective cowling in phantom, and is taken in the direction of the arrow 6 in FIG. 4.

The induction system 51 includes an air silencing and inlet device, shown schematically in this figure and indicated by the reference numeral 53. The actual construction of this air line device appears partially in FIGS. 4 and 6. In actual physical location, this device 53 is contained within the protective cowling at the forward end thereof and has a rearwardly facing air inlet opening 54 through which air is inducted. Air is admitted into the interior of the protective cowling in a known manner, and this is primarily through a pair of rearwardly positioned air inlet openings that appear only in phantom in FIG. 6 of the drawings where they are identified at Ai and have a construction as is generally well known in the art.

Referring again back to FIG. 1, the air inlet device 53 supplies the inducted air to a plurality of throttle bodies 55, each of which has a throttle valve 56 provided therein. These throttle valves 56 are supported on throttle valve shafts. These throttle valve shafts are linked to each other for simultaneous opening and closing of the throttle valves 56 in a manner that is well known in this art.

As is also typical in two cycle engine practice, the intake ports 52 have provided in them reed-type check valves 57. These check valves permit the air to flow into the sections of the crankcase chamber 45 when the pistons 43 are moving upwardly in their respective cylinder bores. However, as the pistons move downwardly, the charge will be compressed in the sections of the crankcase chamber 45. At that time, the reed type check valve 57 will close so as to permit the charge to be compressed.

Figure 2:
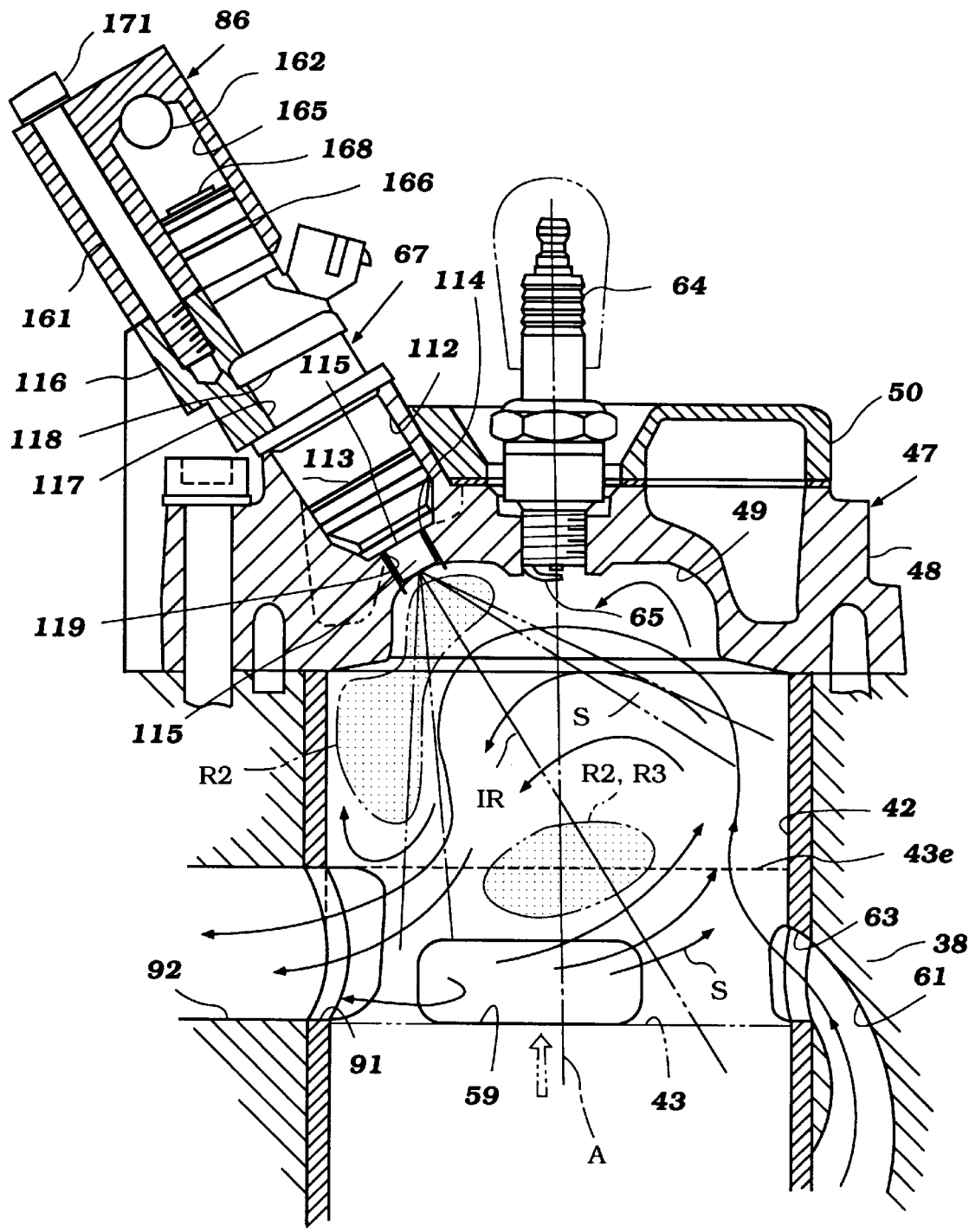
FIG. 2 is an enlarged cross-sectional view taken through a portion of one of the cylinders of the engine of this embodiment and shows in detail the fuel injection spray pattern relative to the scavenging air flow and the residual charge.
Figure 3:
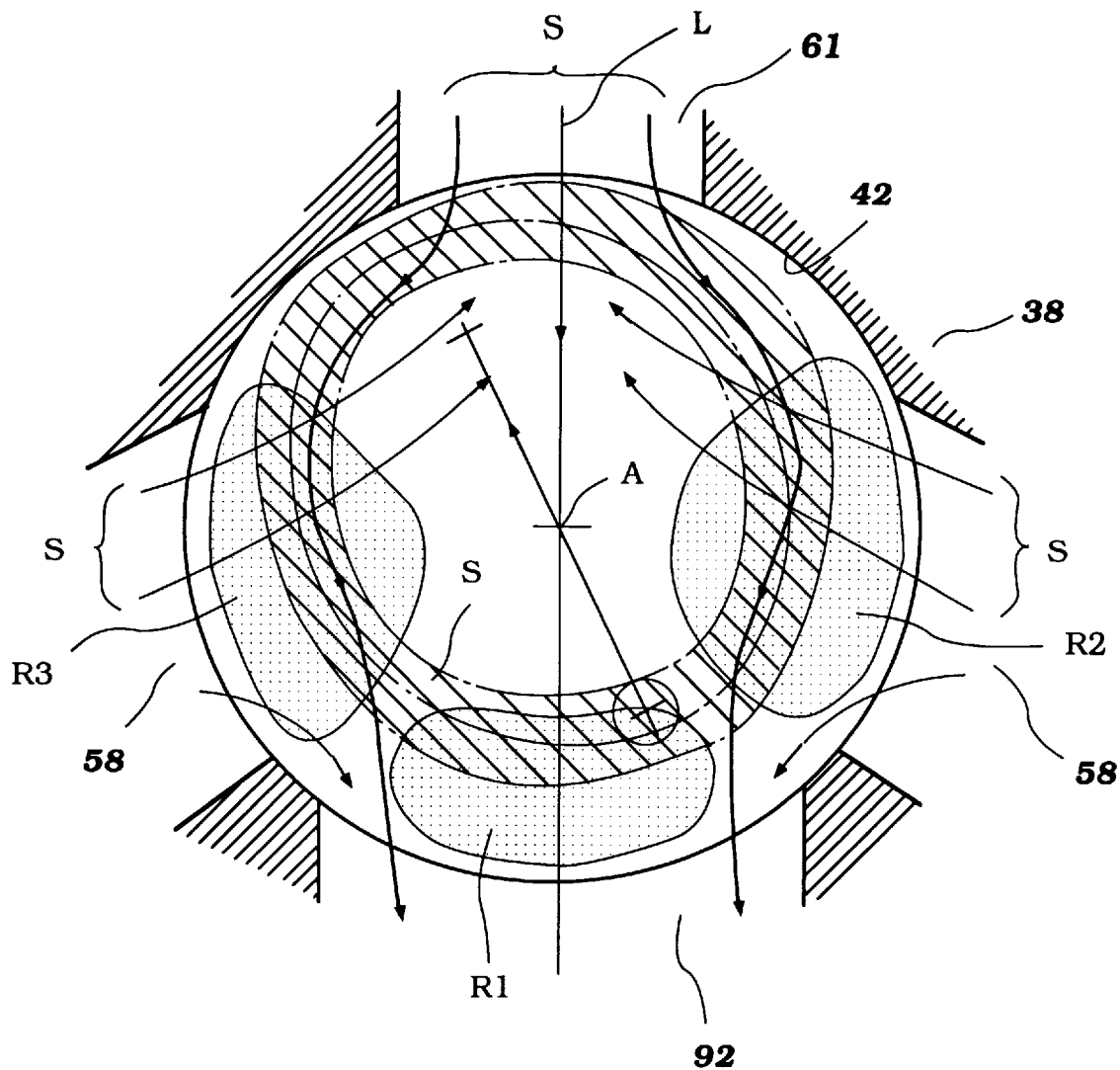
FIG. 3 is a cross-sectional view taken along a plane that passes through the scavenge and exhaust ports and is generally perpendicular to the claim of FIG. 2.

The charge which is compressed in the sections of the crankcase chamber 45 is then transferred to the combustion chambers 49 through a scavenging system which appears best in FIGS. 2 and 3. This scavenging system is of the Schnurl type and includes a pair of main scavenge passages 58 that are positioned on diametrically opposite sides of a plane L containing the axis A of the respective cylinder bore 42. These main scavenge passages 58 terminate in main scavenge ports 59 so as to direct a scavenging air flow as indicated by the arrows S in FIGS. 2 and 3.

In addition, an auxiliary scavenge passage 61 is formed between the main scavenge passages 58 and terminates in an auxiliary scavenging port 62 which also provides scavenging air flow indicated by the arrows S. Thus, during the scavenging stroke, the intake charge will be transferred to the combustion chambers 49 for further compression as the pistons 43 move upwardly from their bottom dead center position so as to close the scavenge ports 59 and 63 and further compress the charge.

Continuing to refer primarily to FIGS. 2 and 3, a spark plug 64 is mounted in the cylinder head assembly 47 for each cylinder bore and has its respective spark gap 65 disposed substantially on the cylinder bore axis A. The spark plug 64 is fired under the control of an ECU, shown schematically in FIG. 1 and identified by the reference numeral 66. This ECU receives certain signals, as will be described, for controlling the time of firing of the spark plugs 64 in accordance with any desired control strategy.

The spark plugs 64 fire a fuel air charge that is formed by mixing fuel directly with the intake air via a fuel injector, indicated generally by the reference numeral 67. The fuel injectors 67 are electrically operated and mounted directly in the cylinder head in a specific location, as will be described, so as to provide optimum fuel vaporization under all running conditions.

Fuel is supplied to the fuel injectors 67 by a fuel supply system, indicated generally by the reference numeral 68 and which will be described first by reference to FIG. 1 and particularly the upper and lower left hand portions thereof.

The fuel supply system 68 is comprised of a main fuel supply tank 69 that is provided in the hull of the watercraft with which the outboard motor 31 is associated. Fuel is drawn from this tank 69 through a conduit 71 by means of a plurality of low pressure pumps 72. These low pressure pumps 72 may, for example, be operated by the variations in pressure in the sections of the crankcase chamber 45, and thus provide a relatively low pressure.

A quick disconnect coupling is provided in the conduit 71 and also a fuel filter 73 is positioned in this conduit at an appropriate location. Specific locations for these components are shown in later, more detailed views.

From the low pressure pump 72, fuel is supplied to a vapor separator 74 which is mounted, in a manner which will be described later, on the engine or within the protective cowling at an appropriate location. This fuel is supplied through a line 75. At the vapor separator end of the line 75, there is provided a float valve that is operated by a float 76 so as to maintain a uniform level of fuel in the vapor separator 74.

A higher pressure, electric fuel pump 77 is provided in the vapor separator 74 and pressurizes fuel that is delivered through a fuel supply line 78 to a high pressure pumping apparatus, indicated generally by the reference numeral 79. A low pressure regulator 81 is positioned in the line 78 at the vapor separator 74 and limits the pressure that is delivered to the high pressure pump 79 by dumping the fuel back to the vapor separator 74.

The high pressure fuel delivery system 79 includes a high pressure pump 82 that has a construction which will be described in more detail later by reference to FIG. 11. It includes a pump drive shaft to which a driving pulley 83 is affixed. This driving pulley 83 is driven from a pulley, to be described, mounted on the crankshaft 36 by means of a drive belt 84.

Fuel is supplied from the high pressure pump 82 to a main fuel manifold 85 that is mounted on the engine and which has a construction which will be described in more detail later. This will be done by primary reference to FIGS. 7–9 and 12–14. The main fuel manifold 85, in turn, delivers fuel to a pair of vertically extending fuel rails 86. This connection and the manner of delivery of fuel will be described later by particular reference to FIGS. 15–18. The fuel rails 86 deliver fuel to the fuel injectors 67 in a manner which will be described later by detailed reference to FIG. 2.

The pressure in the high pressure delivery system 79 is regulated by a high pressure regulator 87 which dumps fuel back to the vapor separator 74 through a pressure relief line 88 in which a fuel heat exchanger or cooler 89 is provided.

Referring again primarily to FIGS. 1–3, after the fuel charge has been formed in the combustion chambers 49 by the injection of fuel from the fuel injectors 67, the charge is fired by firing the spark plugs 64. The strategy by which the injection timing and duration is controlled by the ECU 66, as well as the control for the timing of firing of the spark plug 64 will be described in more detail shortly.

Once the charge burns and expands, the pistons 43 will be driven downwardly in the cylinder bores until the pistons reach a position indicated at 43e in FIG. 2. At this time, an exhaust port 91 will be uncovered so as to open the communication with an exhaust passage 92 formed in the cylinder block 38. It should be noted that the exhaust port 91 and exhaust passage 92 are formed diametrically opposite the auxiliary scavenge passage 61 and its scavenge port 63. However, the exhaust port 91 opens earlier and closes later than all of the scavenge ports 59 and 63.

The exhaust gases flow through the exhaust passages 92 to collector sections 93 of respective exhaust manifolds that are formed within the cylinder block 38 in a manner to be described in more detail later by reference to FIG. 5. These exhaust manifold collector sections 93 communicate with exhaust passages formed in an exhaust guide plate 94 on which the engine 34 is mounted, as clearly seen in the lower left hand view of FIG. 1.

A pair of exhaust pipes 95 depend from these exhaust guide exhaust passages into an expansion chamber 96 formed in the drive shaft housing 32. From this expansion chamber 96, the exhaust gases are discharged to the atmosphere through a suitable exhaust system. As is well known in outboard motor practice, this may include an underwater, high speed exhaust gas discharge and an above the water, low speed exhaust gas discharge. Since these types of systems are well known in the art, a further description of them is not believed to be necessary to permit those skilled in the art to practice the invention.

Although any type of desired control strategy can be employed for controlling the time and duration of fuel injection from the injector 67 and timing of firing of the spark plug 64, it will be apparent from the following description that there is some significance in injector timing to improve good fuel vaporization under difficult running conditions. This will be described in more detail later by particular reference to FIGS. 2 and 3. However, a general discussion of some engine conditions that may be sensed and some other ambient conditions that can be sensed for engine control will follow. It is to be understood, however, that those skilled in the art will readily understand how various control strategies can be employed in conjunction with the components of the invention that will be described in more detail.

Preferably, the control for the fuel air ratio includes a feed back control system. Thus, a combustion condition or oxygen sensor 97 is provided that senses the in cylinder combustion conditions by sensing the residual amount of oxygen in the combustion products at a time near the time when the exhaust port 91 is opened. This is accomplished through a sensor port 97p as seen in FIG. 5. This output and air fuel ratio signal are indicated schematically at 98 to the ECU 66.

There is provided also associated with the crankshaft 36 a crank angle position sensor which when measuring crank angle versus time and output an engine speed signal, indicated schematically at 99. Engine load, as determined by throttle angle of the throttle valves 56, is sensed by a throttle position sensor which outputs a throttle position or load signal 101 to the ECU 66.

There is also provided a pressure sensor 102 in the line connected to the pressure regulator 87. This pressure sensor 102 outputs the high pressure fuel signal to the ECU 66, which signal is indicated schematically at 103. At other times than during normal engine running, the sensor 102 may be utilized for another purpose, as will be described later.

There also may be provided a trim angle sensor 104 (see the lower right hand side view of FIG. 1) which outputs a trim angle signal 105 to the ECU 66.

The sensed conditions are merely some of those conditions which may be sensed for engine control.

The ECU, as has been noted, outputs signals to the fuel injector 67 and spark plug 64 for their respective control. These control signals are indicated schematically in FIG. 1 at 106 and 107, respectively.

It has been noted that when the engine is shut off, it is desirable to release the high pressure that may exist in the fuel supply system and specifically in the main fuel manifold 85 and fuel rails 86. To this end, there is provided an electrically operated pressure release valve 108 that is mounted in a bypass line 109 that extends from the main fuel manifold 85 back to the return line 87 bypassing the pressure regulator 87. When this valve 108 is opened upon the cessation of engine operation via a control signal 111 from the ECU 66, the fuel pressure in the system will be relieved by dumping fuel back to the vapor separator 74.

The mounting of the fuel injector 68 and its positioning and injection strategy in order to obtain good running, particularly under the difficult low speed low load condition will now be described by primary references to FIGS. 2 and 3. First, it will be noted that the main cylinder head member 48 is formed with an opening 112 that is complimentary and receives a main body portion 113 of the fuel injector 67. At its lower end, the injector opening 112 receives a seal 114 that sealingly engages the injector around its discharge nozzle portion 115.

A retainer member 116 has an opening 117 that cooperates with a shoulder 118 formed on the injector body and secures the injector 68 to the cylinder head in this relationship. The nozzle portion 115 extends into a smaller diameter opening 119 formed at the lower periphery of the opening 102 and is located in an area that is preferably disposed in a relatively narrow range above the exhaust port 91 as shown in FIG. 3.

The injector nozzle has a conical spray pattern indicated as an S in FIGS. 2 and 3 which preferably is disposed so that the fuel spray will penetrate the combustion chamber and will come into contact with residual exhaust gas patches R1, R2 and R3 that exist during low speed and low load running conditions when the piston 43 is moving toward top dead center position and after the scavenged ports 59 and 63 and the exhaust port 91 have closed. This is preferably at a relatively short angle before top dead center position of the piston and something in the range of about 3 to 10 degrees of crank rotation before top dead center.

Under this running condition there is little time for the fuel to vaporize before the spark plug is fired. Thus by utilizing the heat of the residual gasses vaporization can be obtained to insure good and complete combustion. Thus, the injected spray will pass through the residual exhaust gases which will still be highly heated. Thus, the residual heat of combustion will help in vaporizing the injected fuel for the next firing cycle and thus will insure that a stoichiometric mixture is present at the gap of the spark plug 65 at the time of firing.

Under high speed high load conditions, fuel injection may be done at something more like 90° before top dead center so as to insure the supply of adequate fuel for combustion.

Having thus described the general overall system, the high pressure fuel supply system 79 will now be described in more detail by reference to the remaining figures of this embodiment. It should be noted that this high pressure system 79 including the high pressure fuel pump 83, the main fuel manifold 85 and the fuel rails 86 are designed so as to be connected substantially rigidly together as a unit. This facilitates mounting on the engine and also reduces the number of flexible hoses, which can cause problems with leakage and wear.

The description of the components will begin with the overall construction of those components which are basically assembled together and initially by reference to FIGS. 6–11. As may be seen in these figures, a driving pulley 121 is affixed to the upper end of the crankshaft 36 to drive the drive belt 84, as previously noted. As may be best seen in FIG. 11, the high pressure pump assembly 83 is comprised of two major components. These comprise a transmission 122 and the pump and pump valving bodies, indicated generally by the reference numeral 123.

Figure 11:
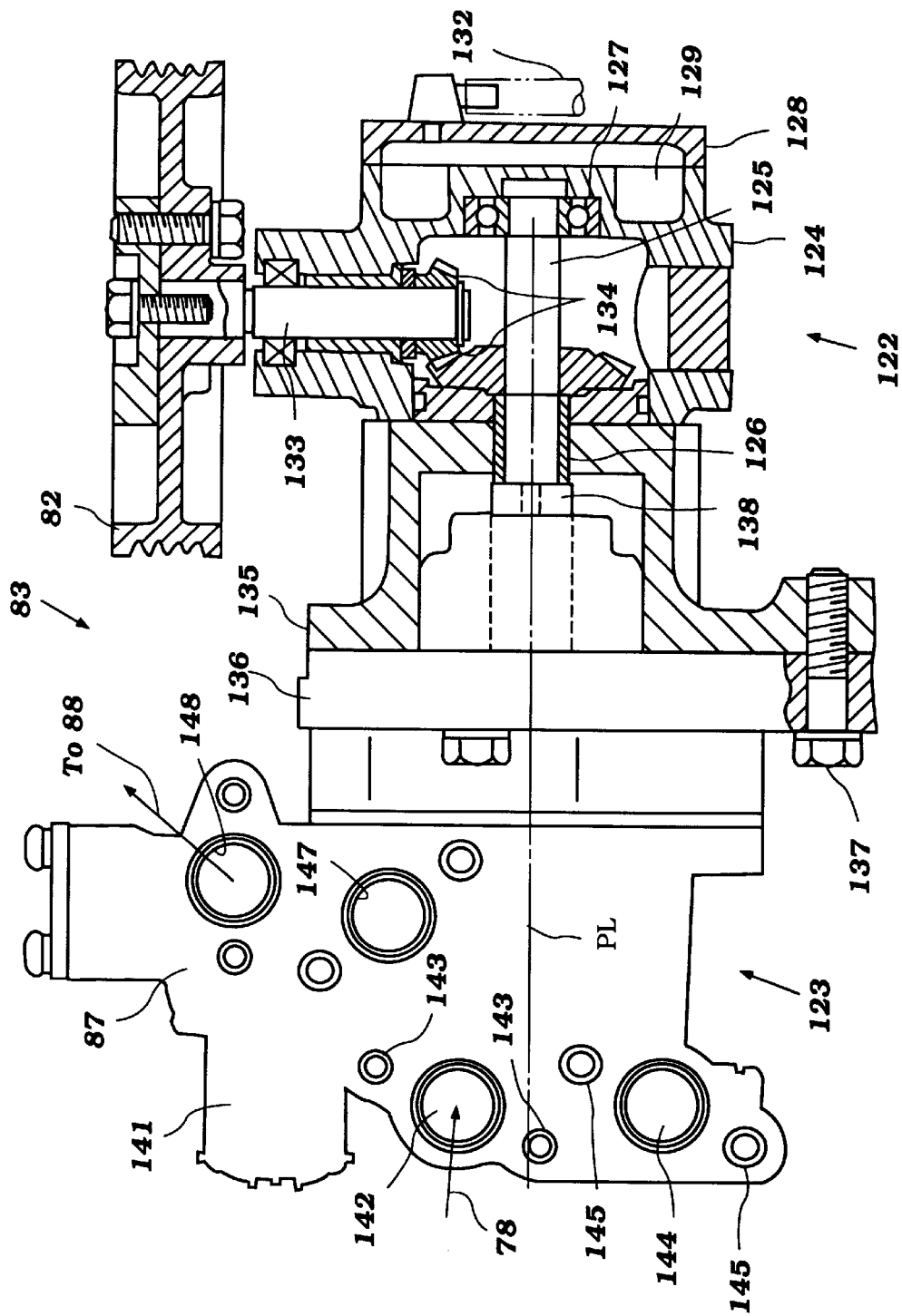
FIG. 11 is a view looking in the direction of the arrow 11 in FIG. 10 and showing a part of the fuel pump drive and cooling system broken away and shown in cross-section.

Continuing to refer primarily to FIG. 11, the transmission portion 122 is comprised of a housing assembly that includes a main housing member 124 in which a pump drive shaft 125 is journaled by means of a plain bearing 126 and a ball bearing 127. The ball bearing 127 is mounted in an end portion of the housing assembly 124 which is closed by a closure plate 128 so as to define a cooling jacket 129.

The cooling jacket 129 receives cooling water from an engine cooling jacket, indicated generally by the reference numeral 131 through a conduit 132. As is known in the marine field, the water for cooling is drawn from the body of water in which the watercraft is operating and returned thereto after having passed through the respective cooling jackets. A suitable return conduit (not shown) is also provided to return that cooling water that has been circulated through the water jacket 129.

Because the pump drive pulley 82 and drive belt 84 are in proximity to the cowling air inlets Ai (FIG. 4) the pump and drive will be cooled by the air flow caused by their movement.

An input shaft 133 is journaled in the housing member 124 and has the driving pulley 82 affixed to its upper end. A pair of intermeshing bevel gears 134 transmit the drive from the intake shaft 133 to the pump drive shaft 125. This type of transmission can generate some heat and the cooling jacket 124 and air flow previously referred to assists in dissipating that heat and ensuring that the high pressure fuel pump 83 and particularly the pumping unit 123 will be cooled so as to not heat the fuel that is delivered to the injection system. This will ensure against vapor being generated in the fuel system.

The transmission housing 124 is connected by means of an intermediate member 135 to a flange 136 of the main high pressure pump body 123 by means of threaded fasteners 137. The pump body has a nose piece through which the pump shaft 138 extends so as to be coupled by a splined coupling or coupling of another type to the pump drive shaft 125.

These shafts rotate about a generally horizontally extending axis indicated at PL which extends transversely across the upper portion of the engine 34 in an area that is disposed above and partly depending into the valley formed between the cylinder banks 39 and 41.

The pump body, indicated generally by the reference numeral 141, is formed with a plurality of tapped openings to receive fasteners for attachment to a support plate and also to the main fuel manifold 85 in a manner which will be described shortly. As may be seen, the pump body 141 is formed with an inlet opening 142 that is adapted to receive a fitting connected to one end of the fluid conduit which has been indicated schematically as 78 in FIG. 1. A pair of tapped openings 143 permit attachment of this fitting so that fuel can be delivered to the high pressure pump.

A pump discharge fitting 144 is formed below this inlet fitting and is positioned so as to be attached, in a manner to be described, directly to the main fuel manifold 85 so as to limit the necessity for a separate, external conduit. Tapped openings 145 receive fasteners for this purpose.

In accordance with another feature that assists in minimizing the number of external conduits required, the high pressure regulator 87 previously referred to is actually built directly into the pump body 141. A small L-shaped fitting member 146 (FIGS. 7 and 8) is attached to a pressure sensing inlet fitting 147 formed in the pump body 41 so as to transmit the fluid pressure from the main fuel manifold 85 to the pressure regulator 87.

The return conduit 88 from the high pressure regulator 87 is connected to a relief fitting opening 148 formed in the pump body 141 vertically above the pressure regulator inlet opening 147. Thus, the number of external conduit is still further reduced by this arrangement that incorporates the regulator 87 directly into the body 141 of the high pressure pump assembly 83. The vertical spacing of the various fittings also assist in the relief of air back toward the vapor separator 74 when the engine has shut down and is again started up.

Figure 12:
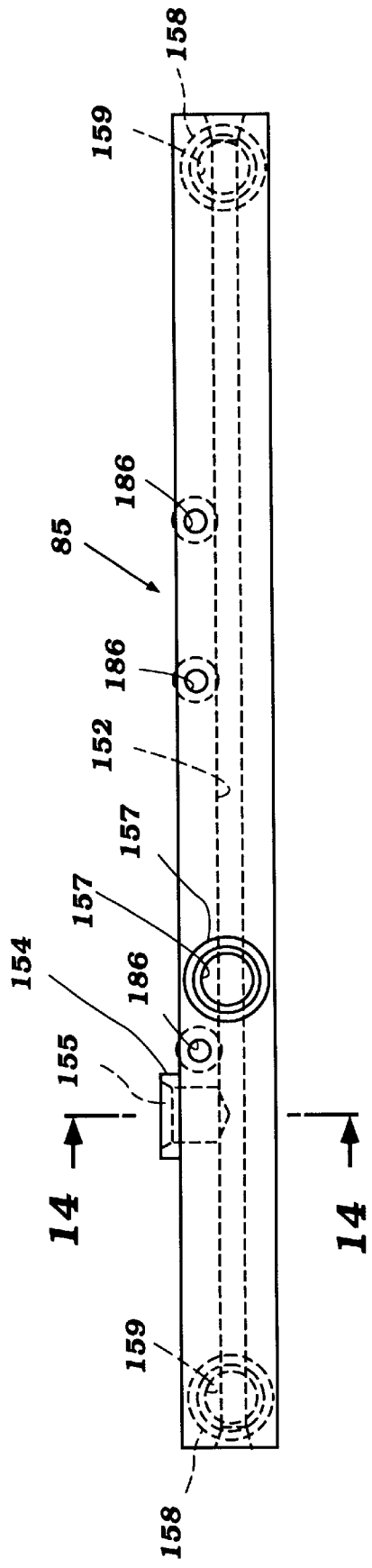
FIG. 12 is a top plan view showing the main fuel manifold.
Figure 13:
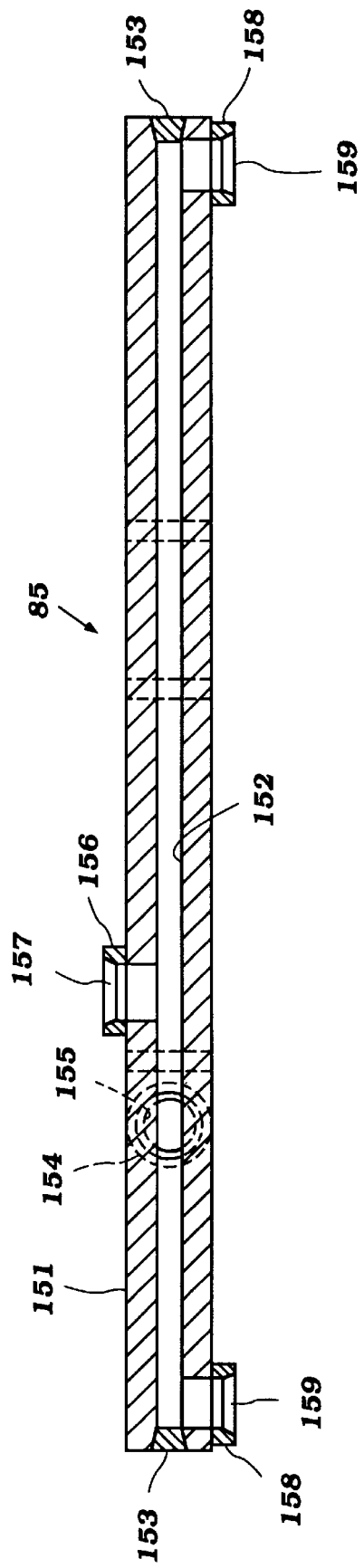
FIG. 13 is a cross-sectional view taken along a plane perpendicular to the plane of FIG. 12 and passing through the center of the main fuel manifold.

The construction of the main fuel manifold 85 will now be described by principal reference to FIGS. 12–14. This main fuel manifold 85 is comprised of a generally rectangular metal body member 151 that is formed with a through drilling 152. This drilling 152 is closed at its outer ends by end plug 153.

Figure 14:
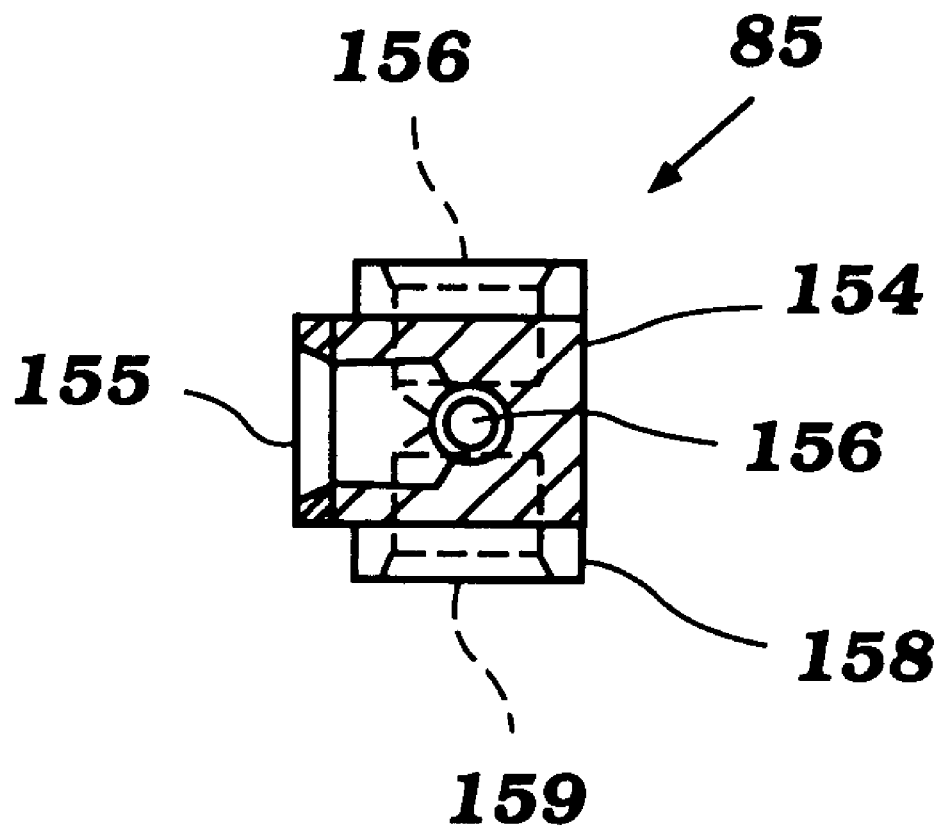
FIG. 14 is a cross-sectional view taken along the line 14—14 of FIG. 12.

The side of the body 151 is provided with a first fitting member, indicated at 154 and which is shown in most detail in FIG. 14. This member 154 has an opening 155 that is adapted to be received in fluid communication with the high pressure pump outlet fitting 144. Through a connector of the type shown in FIG. 18 or only employing an O-ring seal therebetween. Thus, no external conduit are required for this communication. The fitting 154 has a cross drilling 156 that permits the high pressure fuel to communicate with the manifold passage or drilling 152.

The upper surface of the manifold body 155 and the surface which extends transversely to the surface in which the fitting 154 is received receives a further fitting 156, which fitting has an opening 157 so as to couple to the L-shaped connector 156 to communicate the pressure in the manifold passage 152 with the pressure regulator as aforenoted by the same measures as used in the connection to the high pressure pump outlet 144.

At the ends of the manifold 151 and on the under surface thereof, there are provided a pair of fittings 158 which have openings 159 so as to receive a coupling to provide a connection to the fuel rails 86, as will be described shortly by reference to FIG. 18.

Figure 15:
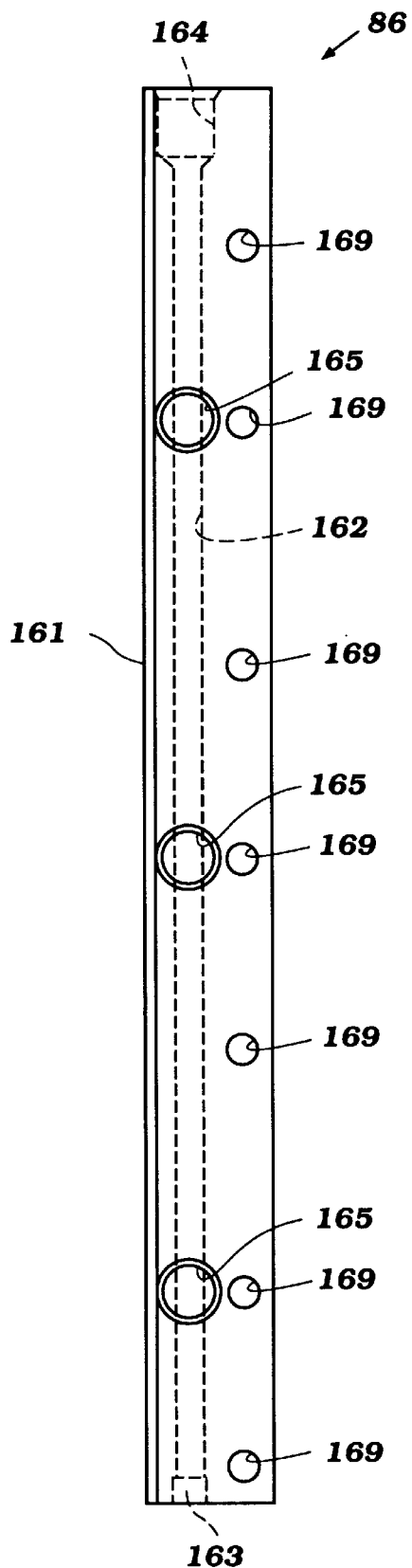
FIG. 15 is an elevational view showing the side of the main fuel rail that mounts to the fuel injectors.
Figure 16:
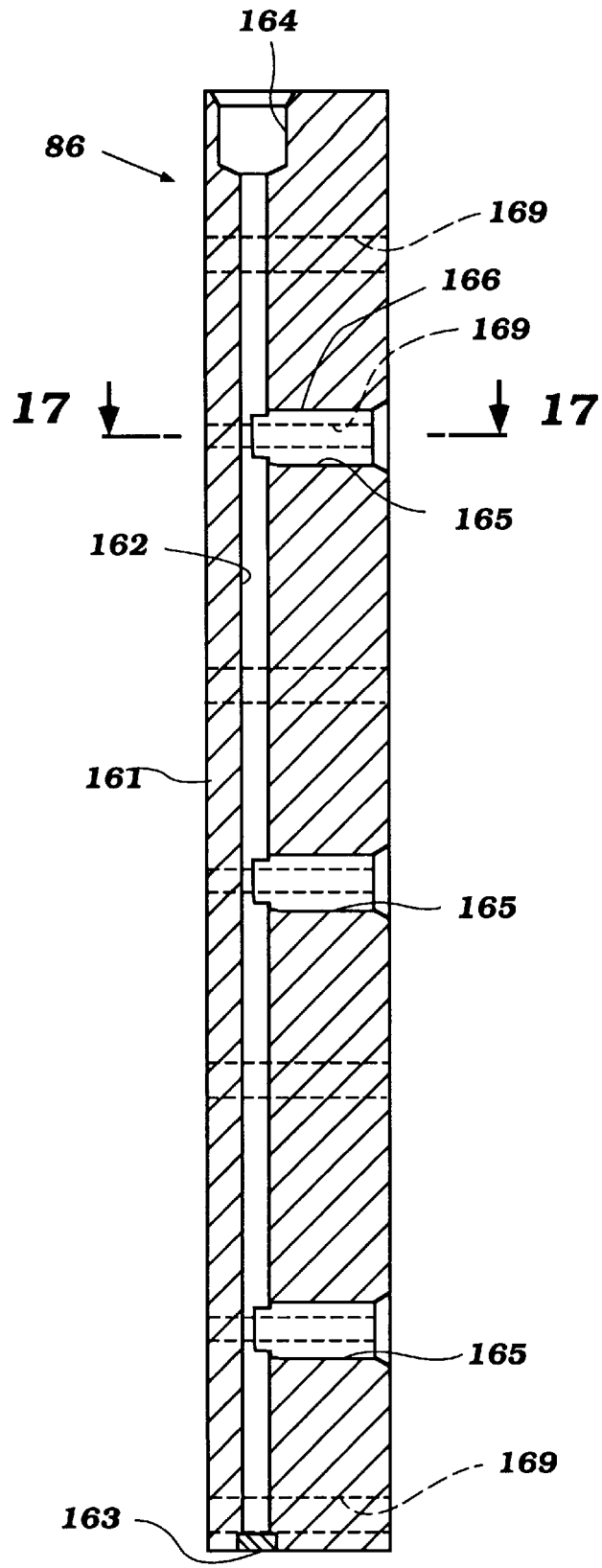
FIG. 16 is a cross-sectional view taken through a plane perpendicular to the plane of FIG. 15 and passing through the center of the fuel delivery passage.
Figure 17:
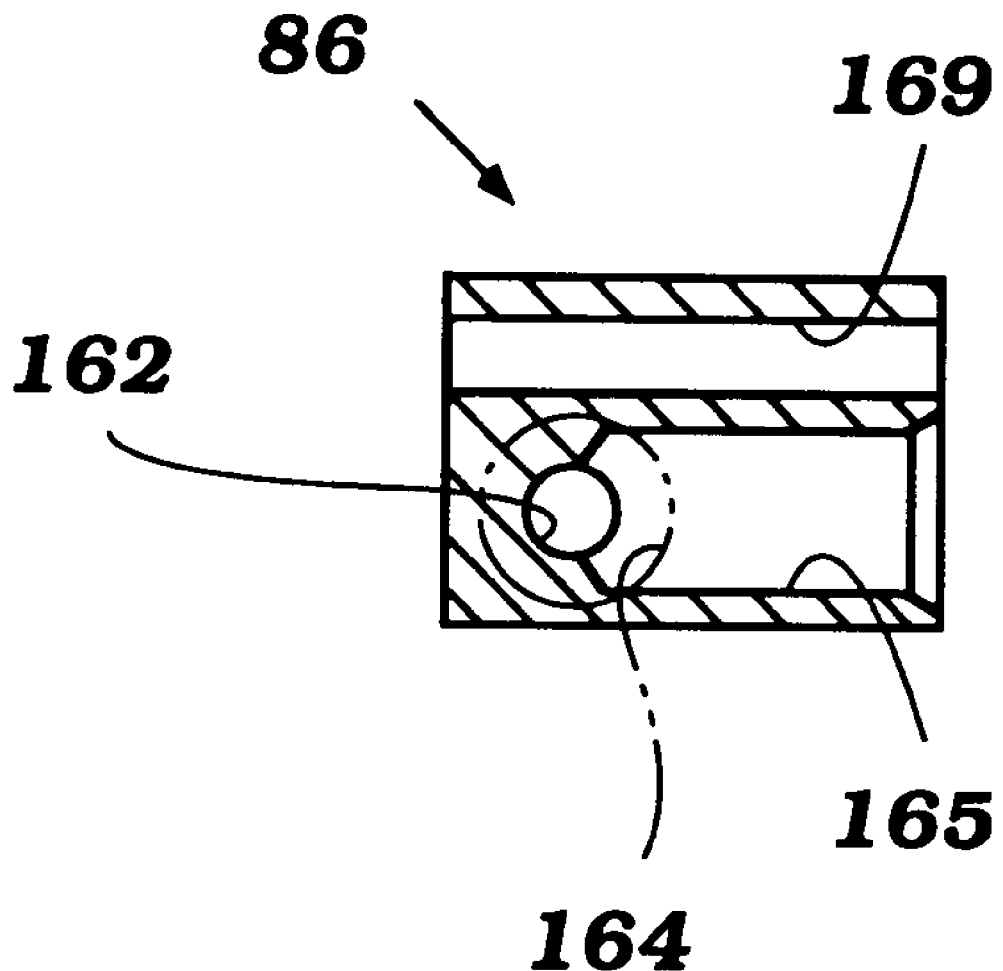
FIG. 17 is a cross-sectional view taken along the line 17—17 of FIG. 16.

The construction of the main fuel rails 86 will now be described by particular reference to FIGS. 15–17. Like the fuel manifold 85, the main fuel rails 186 are formed from rectangular metal bodies 161. A drilled passageway 162 extends vertically through these bodies from their upper ends to their lower ends. The lower ends thereof are closed by a closure plug 163. The upper end is provided with a counterbored opening 164 that receives a coupling member as will be described later by reference to FIG. 18 which may be the same as the type coupling member employed to connect the high pressure fuel pump outlet 144 with the inlet fitting 155 of the main fuel manifold 85. These couplings cooperate with the fitting openings 159 of the main fuel manifold 85 as will also be described.

In the area where each of the fuel injectors 67 of the respective cylinder bank lie, the fuel rail body 161 is provided with a drilled passageway 165 which penetrates far enough into the body 161 to intersect the drilling 162 without having to be plugged at its outer end. These drillings 165 receive elastic sleeves 166 having openings 167 that are complementary to fuel nozzle portions 168 of the fuel injectors 67 so as to deliver fuel to them as seen in FIG. 2.

Drilled openings 169 also extend through the fuel rail 86 and the body 161 thereof to receive threaded fasteners 171 so as to affix the fuel rail 186 rigidly to the injector mounting elements 161 and, accordingly, to the cylinder head assemblies 47.

The couplings that are employed between the main fuel manifold 85 and the fuel rails 86 as well as those which may be employed between the high pressure fuel pump 83 and the main fuel manifold 85 as well as between the fitting 146 and the pressure regulator portion of the high pressure fuel pump 83 will now be described by particular reference to FIG. 18.

Figure 18:
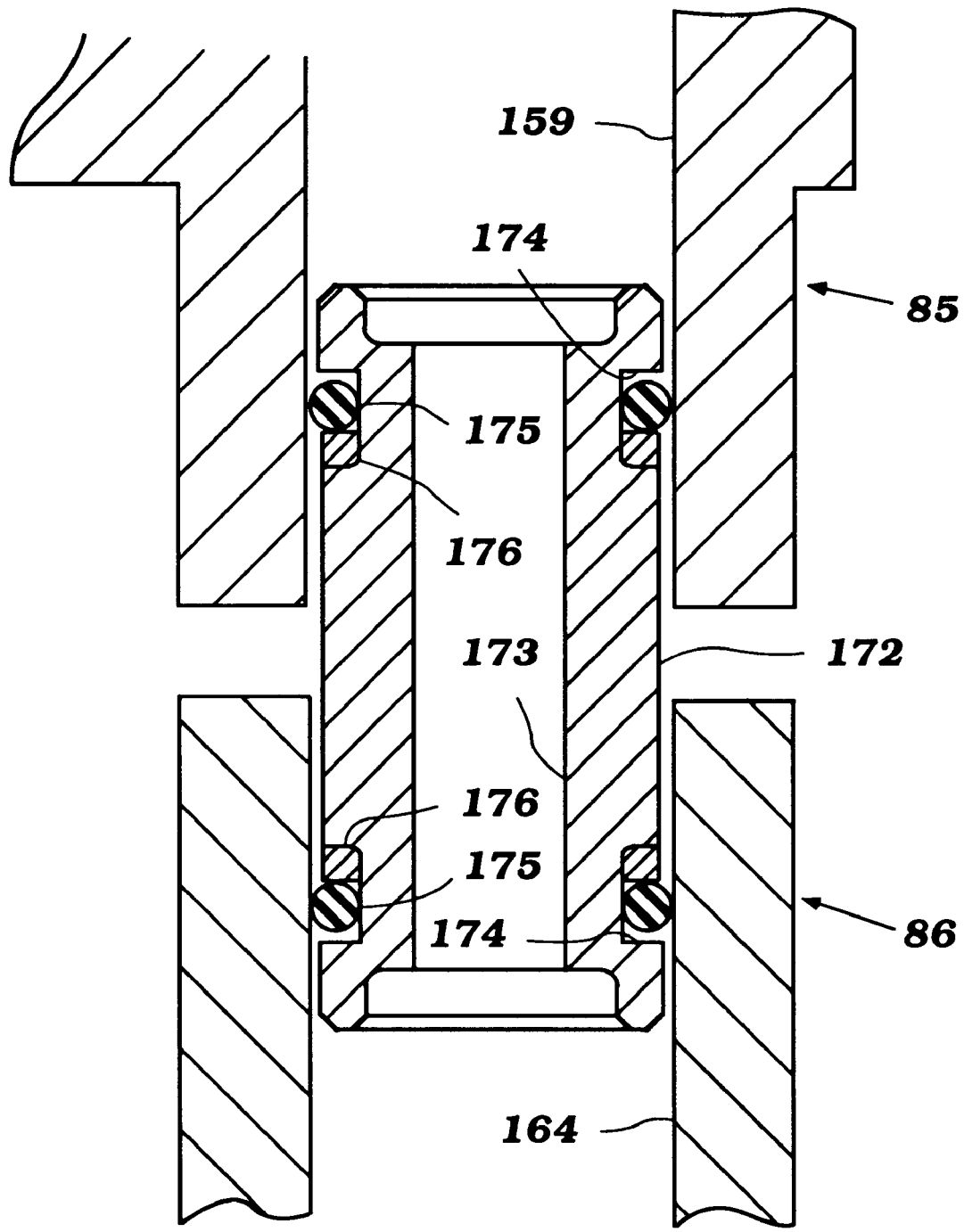
FIG. 18 is an enlarged cross-sectional view showing one of the connectors for connecting the main fuel manifold to one of the fuel rails.

FIG. 18 shows specifically the connection between the main fuel manifold 85 and one of the fuel rails 86. There is provided a cylindrical coupling member 172 that is provided with a central bore 173 and which is also formed with a pair of seal receiving grooves 174 at its opposite ends. Each of these grooves 174 receives a respective O-ring 175 and a nylon backup member 176 so as to provide a leak-tight connection between these elements and one which does not require threaded fittings.

Figure 9:
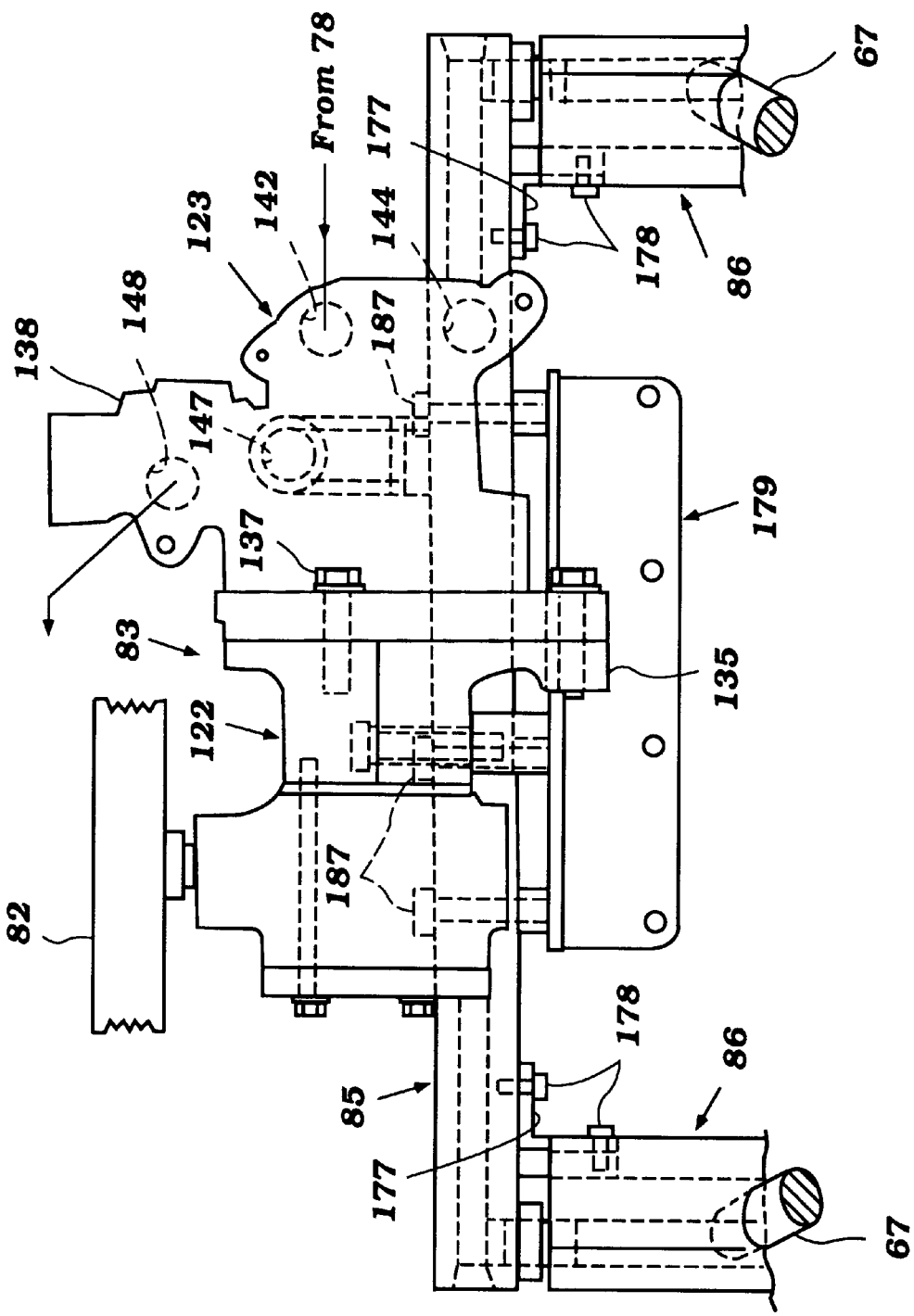
FIG. 9 is a view looking in the same direction as FIG. 7 and shows those components of the fuel supply system illustrated in FIG. 8.
Figure 10:
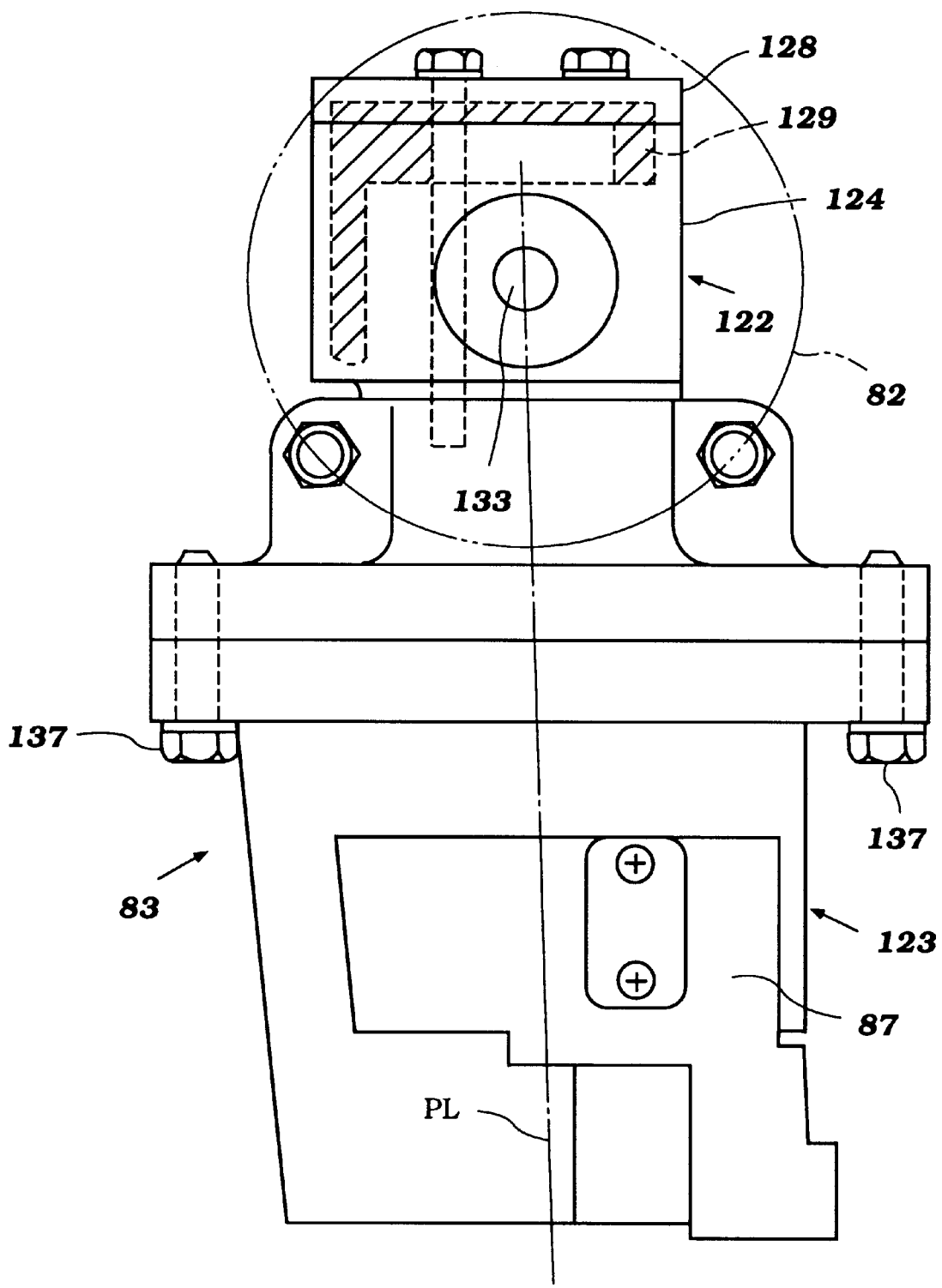
FIG. 10 is an enlarged top plan view showing the high pressure fuel pump with the drive pulley thereof being shown in phantom.

In order to hold the main fuel manifold 85 in position relative to the fuel rails 86, a structure as shown in FIG. 9 is employed. This is comprised of an L-shaped bracket 177 that is abuttingly engaged with the surfaces of the fuel manifold 85 and the fuel rails 86 and Fixed to them by threaded fasteners 178. As a result, this provides a unitary assembly which will ensure that the components are held together in sealed relationship without requiring threaded fittings or flexible conduits.

Figure 19:
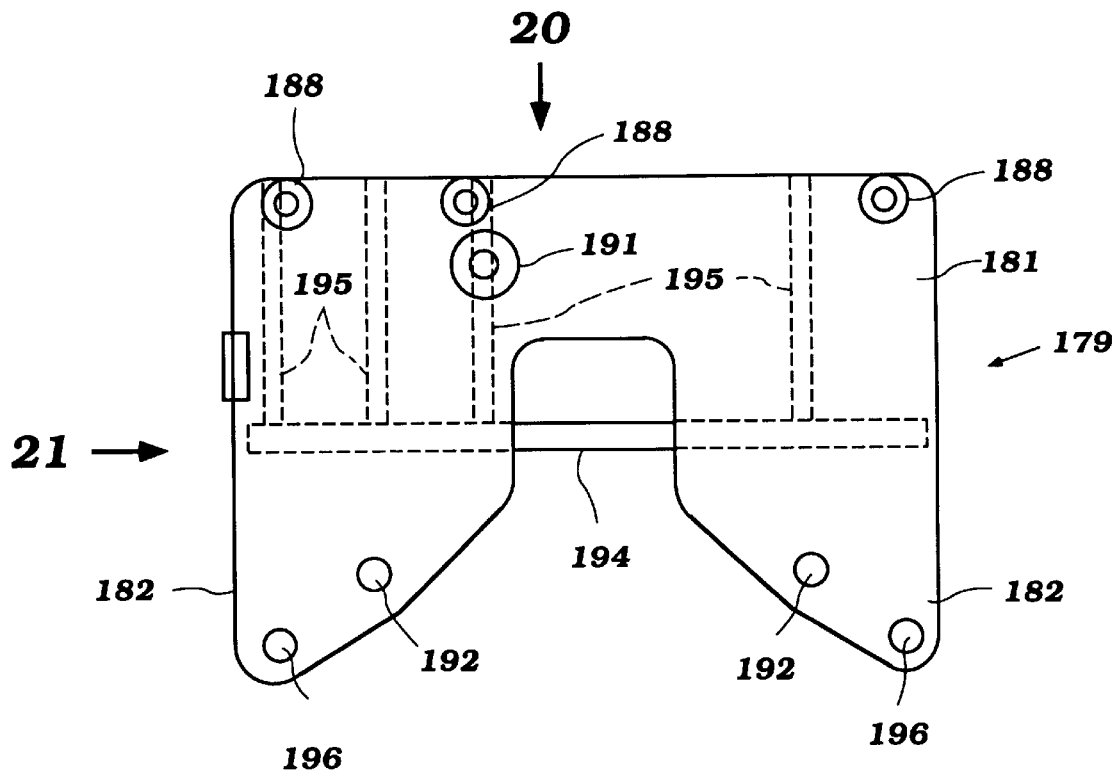
FIG. 19 is a top plan view of the mounting bracket for the high pressure fuel injection pump.
Figure 20:
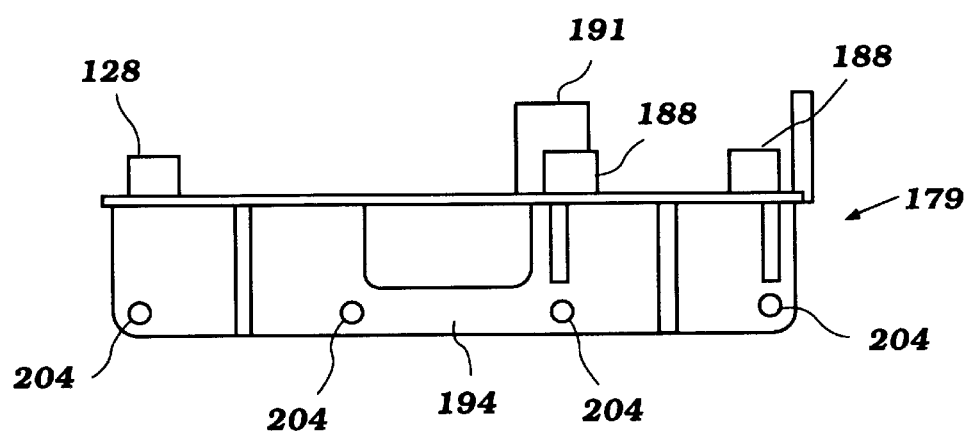
FIG. 20 is a view of the mounting bracket looking in the direction of the arrow 20 in FIG. 19.
Figure 21:
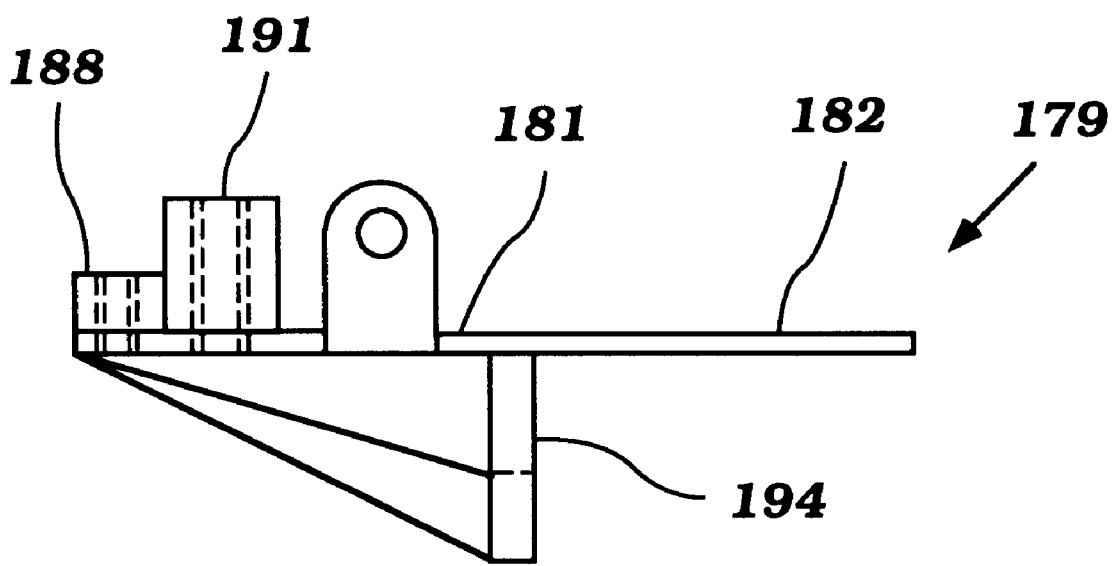
FIG. 21 is a view of the mounting bracket looking in the direction of the arrow 21 in FIG. 19.

This entire assembly is then mounted on the mounting bracket shown in most detail in FIGS. 19–21 and which is indicated generally by the reference numeral 179. This mounting bracket 179 may be formed from a suitable high strength lightweight material such as an aluminum or aluminum alloy.

This member has a horizontally extending surface 181 with a pair of forwardly extending tabbed portions 182 which define an opening between them. The portion 181 is adapted to underlie the main fuel manifold 85. The main fuel manifold 85 is provided through openings 186 that are adapted to receive threaded fasteners 187 as seen in FIG. 9. These threaded fasteners are threaded into tapped openings formed on mounting bosses 188 that extend upwardly from the mounting plate surface 181.

Figure 8:
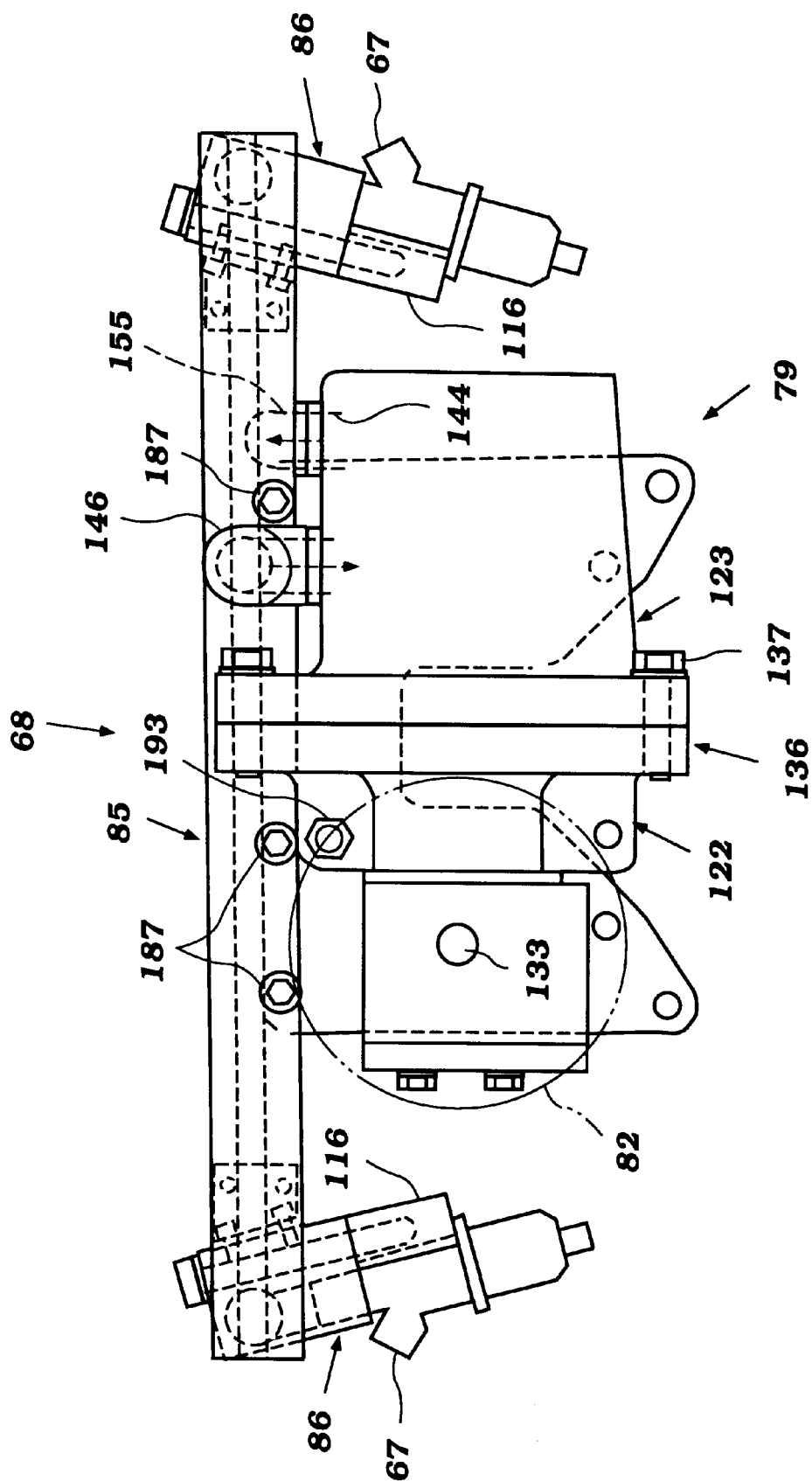
FIG. 8 is an enlarged top plan view, looking in the same direction as FIG. 4, but shows only the high pressure pump and its association with the main fuel delivery system.

As best seen in FIG. 8, the high pressure fuel pump assembly 79 has one rearward opening and a pair of forward openings. One of these openings overlies a further boss 191 formed on the mounting plate portion 181. The other openings overlie a pair of openings 192 that are formed on the extending portions 182 of the mounting plate 179. Threaded fasteners 193 pass through these openings so as to secure the high pressure pump assembly 79 also to the mounting plate 179.

Finally, the mounting plate 179 has a depending rib 194 that is provided for reinforcing purposes and which has a plurality of ribs 195 that extend beneath the surface 181 to add rigidity in this area.

A pair of forwardly positioned apertures 196 are formed in the forwardmost portion of the mounting plate projections 182 and receive threaded fasteners for fixing the mounting plate 182 to the upper surfaces of the cylinder banks 39 and 41, respectively, so as to provide a secure mount for the pump assembly and manifold on the engine.

Figure 5:
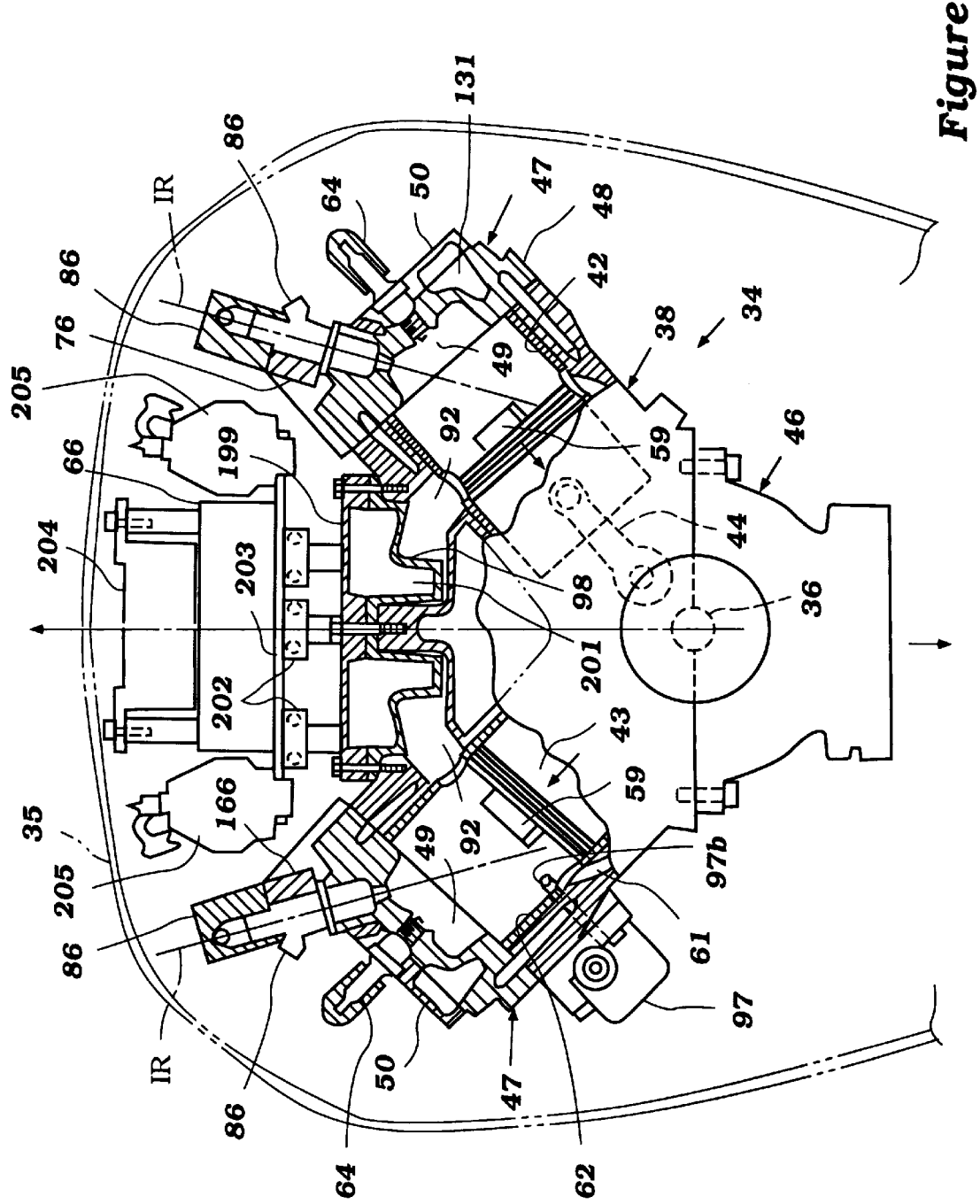
FIG. 5 is a view looking in the same direction as FIG. 5, but with the accessories, including the high pressure fuel pump, removed and with the engine broken away and shown in section.
Figure 7:
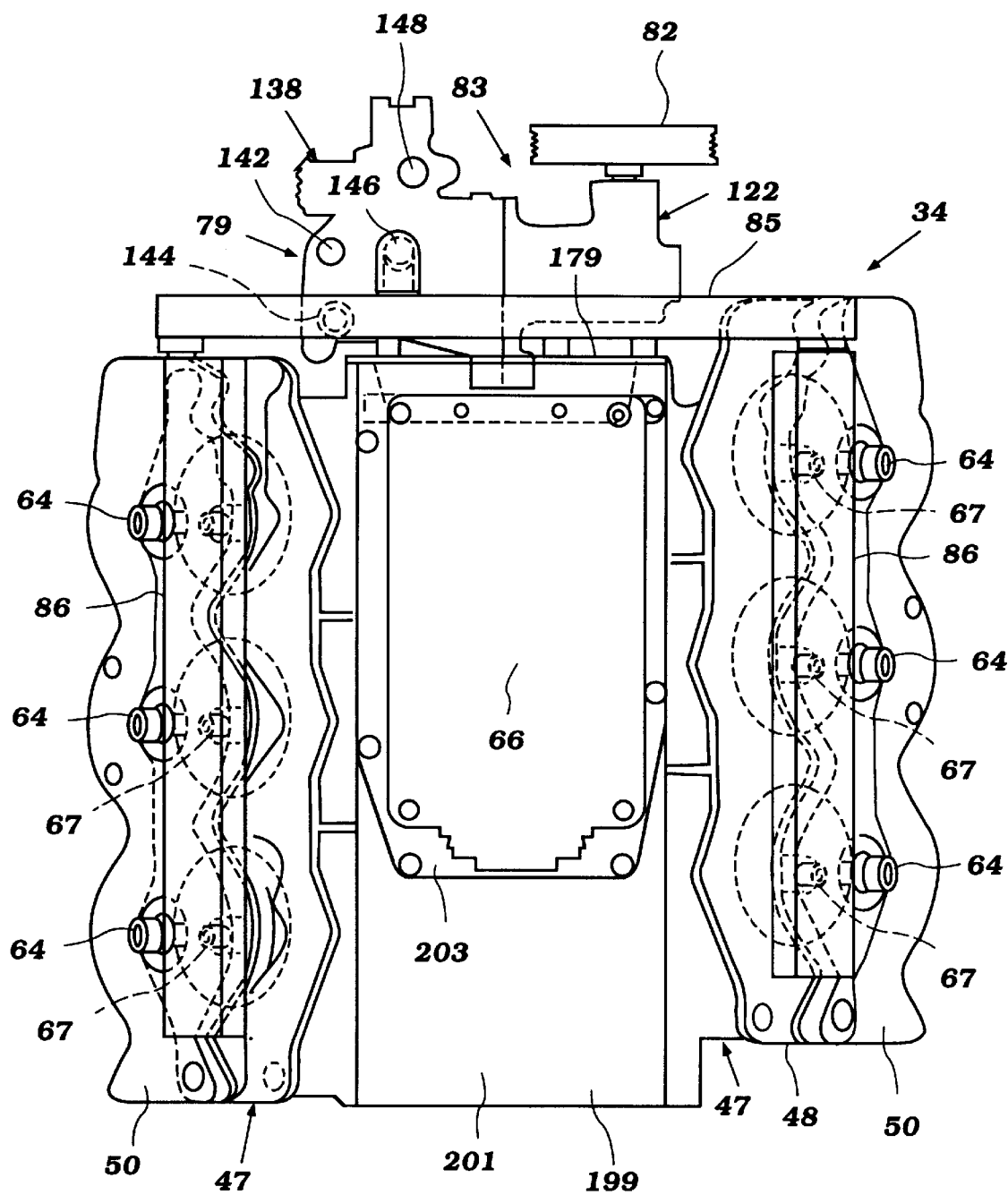
FIG. 7 is a rear elevational view of the engine and is taken generally in the direction of the arrow 7 in FIG. 4.

Referring now primarily to FIGS. 5 and 7, the mounting for certain of the control elements including the ECU 66 will be described. As may be seen in this Figure, the valley between the cylinder bank is closed by a closure plate 198 which also partially encloses the exhaust manifold in part by the cylinder block. A further cover plate 199 encloses this closure plate 198 to form a water jacket 201 through which cooling water may be passed so as to cool the exhaust system.

Mounted on the cover plate 199 by means that include elastic isolators 202 is mounting board 203 which carries the ECU 66. In addition, a solenoid coil driver arrangement 204 may be mounted on the outer side of the ECU in this area. This solenoid coil driver arrangement drives the solenoid associated with the fuel injector 86 for opening the valves. In addition, this assembly may be attached at its upper end to the mounting bracket 179 through threaded fasteners that pass through apertures 204 (FIG. 20) formed in the flange portion 194 thereof.

The spark coils for firing the spark plug 64, are indicated by the reference numeral 205 and are mounted on the adjacent side of the mounting plate 203 so as to minimize the length of wiring and makes the electrical connections more secure.

It has been mentioned that there is a desire to be able to pressure test the system. This is accomplished with utilization of only the single pressure gauge 102 and is done by means of a check valve arrangement as best shown in FIG. 1 and particularly the upper view thereof. It should be noted that the conduit 78 leading from the high pressure electric fuel pump 77 to the higher pressure, mechanical fuel pump 83 includes a branch passage 206, which bypasses the inlet and outlet sides of the high pressure pump 83. This conduit 206 extends in essence between the pump inlet and outlet fittings 142 and 145 as shown in FIG. 11 and may be located within the pump body 141.

A check valve 207 is provided in this bypass conduit 206 that permits flow to pass around the high pressure pump 83. However, there is provided a further check valve 208 in the outlet side of the high pressure pump 83 between it and the discharge of the conduit 206. This is also preferably located within the pump body 141.

Thus, when the high pressure pump 83 is operating, the check valve 208 will open and force the check valve 207 closed so that no fluid pressure will be lost. However, by stopping the engine and running the electric pump 77, the fluid will flow through the conduit 78 and bypass conduit 206 to close the check valve 208 and provide a pressure signal at the sensor 102. This may be used to check the integrity of the lower pressure fuel system.

Figure 22:
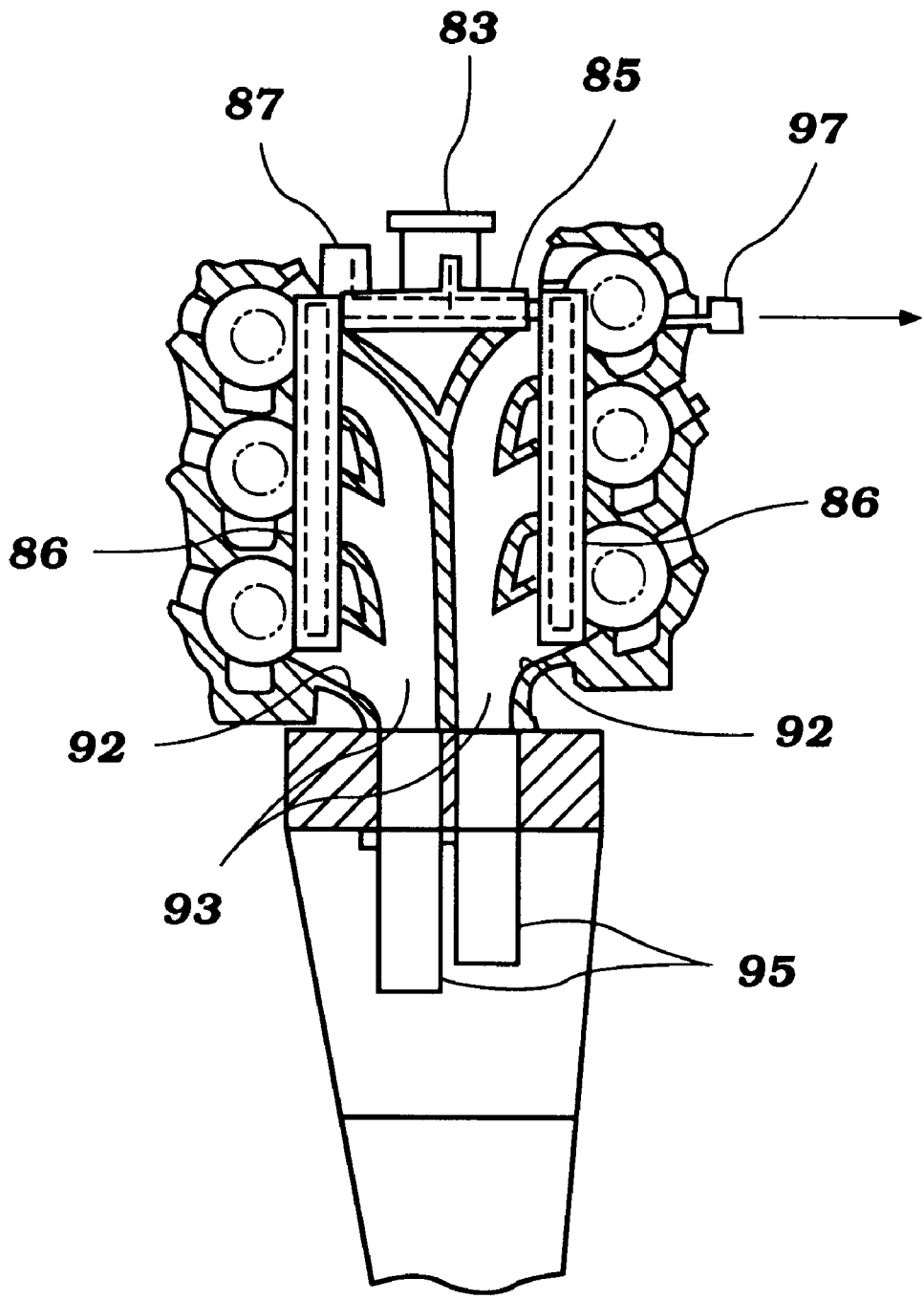
FIG. 22 is a view, in part similar to the lower left hand side view of FIG. 1, and shows a second embodiment of the invention.

During normal engine running, the pressure sensor 102 will indicate that the high pressure side is not leaking and thus, the system can be used and checked with a single pressure tap. In the embodiment as thus far described, the main fuel manifold 85 has extended transversely across the upper surface of the fuel rails 86. FIG. 22 shows another embodiment in the invention which is the same as that already described except for the relationship between the main fuel manifold 85 and the fuel rails 86. For that reason, only this single view, which is a reduced scale view similar to the lower left hand portion of FIG. 1, is believed necessary to permit those skilled in the art to practice the invention. In this embodiment, the main fuel manifold is shorter in length and is joined to the fuel rails 86 through their sides rather than through their upper ends.

Figure 23:
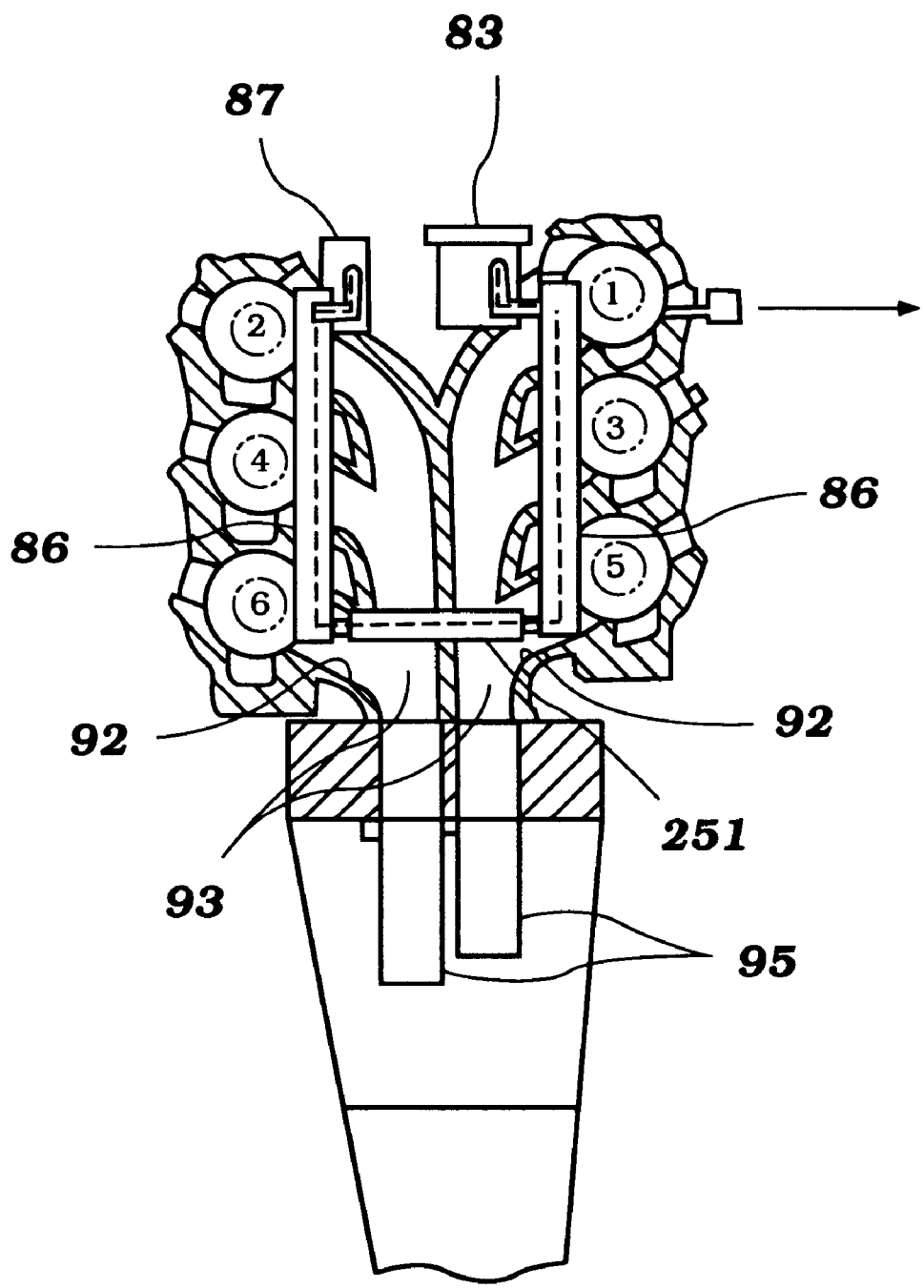
FIG. 23 is a view, in part similar to the lower left hand view of FIG. 1 and to FIG. 2, and shows a third embodiment of the invention.

FIG. 23 shows another embodiment wherein the manifolding arrangement similar to that utilized in FIG. 22 is employed. In this embodiment, however, a transfer manifold 251 having a construction like the earlier main fuel manifold 85 but which is not a main fuel manifold connects the bottom of the two fuel rails 86 as seen in FIG. 23. The high pressure fuel pump 83, therefore, delivers fuel to one of the fuel rails 86 through its upper inlet fittings and the pressure regulator inlet is dispose at the upper end of the other fuel rail.

Figure 24:
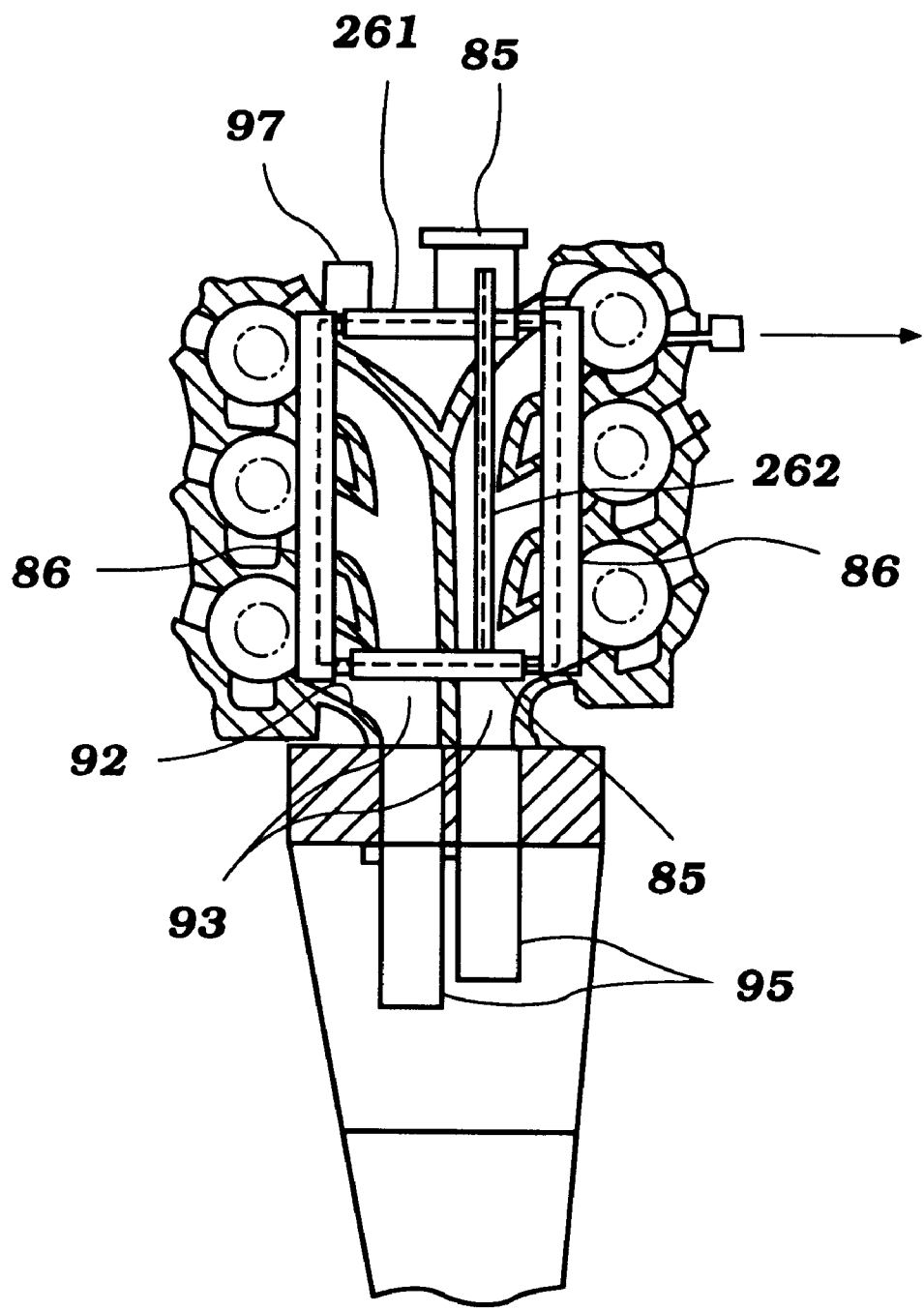
FIG. 24 is a view, in part similar to the lower left hand view of FIG. 1 and FIGS. 22 and 23, and shows a fourth embodiment of the invention.

FIG. 24 shows another embodiment that differs from those already described and in the manifolding arrangement. In this embodiment, fuel is supplied to a main fuel manifold 85 that is positioned at the lower end of the construction between the lower ends of the fuel rails 86. A cross manifold 261 is also provided between the upper ends of the manifolds. High pressure fuel is supplied to the main fuel manifold 85 through a delivery manifold 262 which communicates directly with the high pressure fuel pump outlet.

Figure 25:
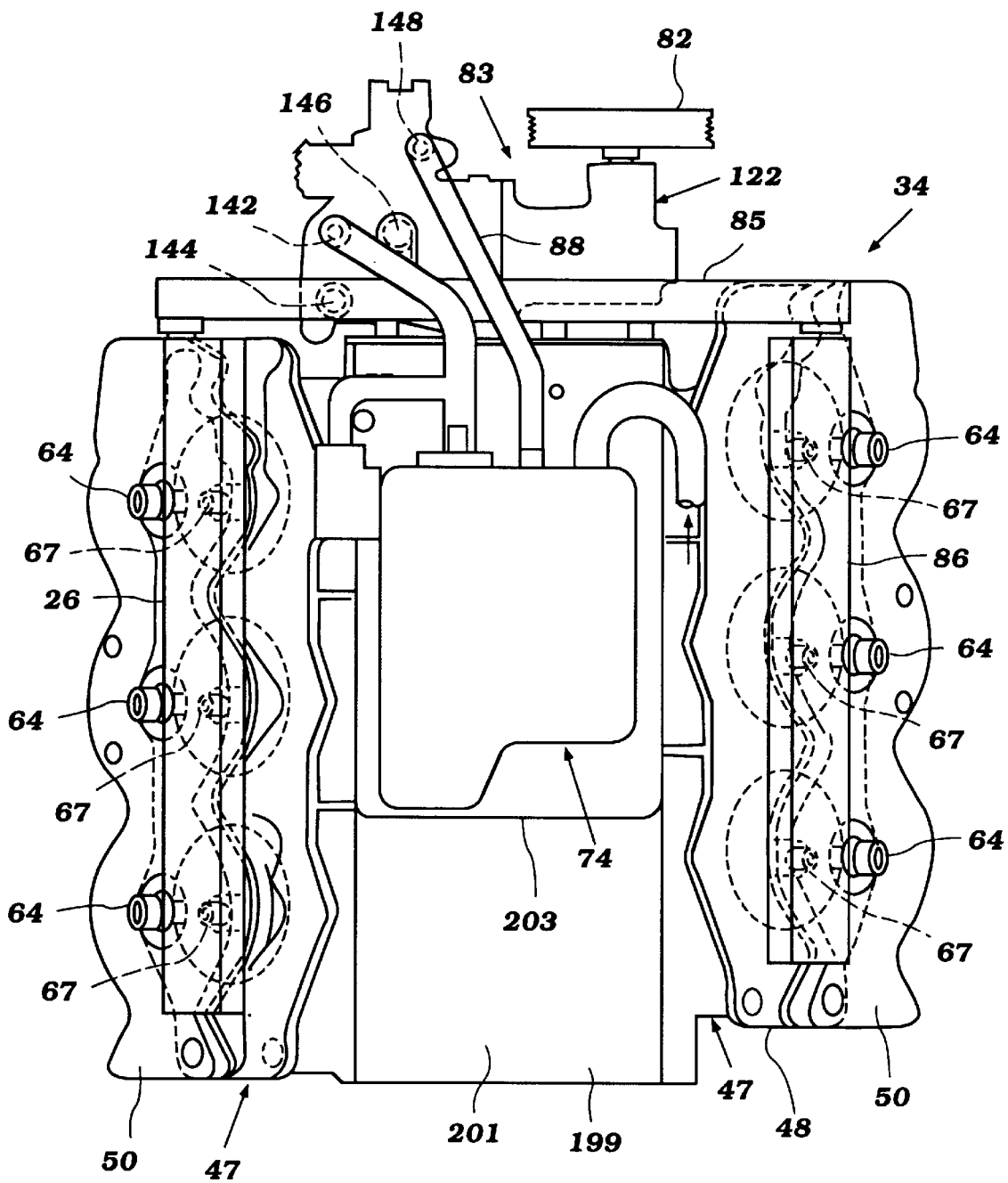
FIG. 25 is a rear elevational view, in part similar to FIG. 7, and shows a fifth embodiment of the invention.

FIG. 25 shows a final embodiment of this invention and in this embodiment, the vapor separator 74 is mounted on the back of the mounting plate for the control body.

Thus, from the foregoing description, it should be readily apparent that the described embodiment of the invention provides a very effective fuel supply system for an outboard motor wherein the number of components can be significantly reduced as well as the elimination of many of the flexible conduits normally employed. This also permits the fuel system to be assembled as a relatively unitary assembly that can be then affixed to the engine. The arrangement is such that purging of the system from vapors during shutdowns is easily accomplished and the system can be purged without complicated construction. Furthermore, the system can be pressure tested by an arrangement where the low pressure system can bypass the high pressure system when the engine is not operating so as to be pressurized for testing purposes. However, when the high pressure system operates, then the bypass line will be closed by the shunting valve arrangement as shown in FIG. 1.

Of course, the foregoing description is that of preferred embodiments of the invention. Various changes and modifications may be made without departing from the spirit and scope of the invention, as defined by the appended claims.

I claim:

1. A direct injection system for a two cycle internal combustion engine said engine being comprised of a cylinder bore closed at one end by a cylinder head and at the other end by a piston reciprocating in said cylinder bore to define a combustion chamber, an exhaust port and at least one scavenge port formed in said cylinder bore for exhausting the burnt combustion products from and for introducing a fresh air charge to said combustion chamber, a fuel injector mounted for injecting fuel directly into said combustion chamber, a spark plug mounted in said combustion chamber for firing the charge therein, said fuel injector being supplied with fuel under pressure by a fuel supply and control system, said control system controlling the timing of fuel injection under low speed, low load conditions so that the fuel is injected into an area where residual combustion products reside so as to improve fuel vaporization.

2. A direct injection system as set forth in claim 1 wherein the fuel injector is mounted in the cylinder head.

3. A direct injection system as set forth in claim 1 wherein the fuel injector is mounted above the exhaust port.

4. A direct injection system as set forth in claim 1 wherein there is provided a pair of scavenge ports on opposite sides of the exhaust port.

5. A direct injection system as set forth in claim 4 wherein the fuel injector is in the path of scavenge flow toward the exhaust port.

6. A direct injection system as set forth in claim 5 wherein the fuel injector is mounted in the cylinder head.

7. A direct injection system as set forth in claim 5 wherein the fuel injector is mounted above the exhaust port.

8. A direct injection system as set forth in claim 4 wherein there is also provided an auxiliary scavenge port diametrically opposite the exhaust port and between the pair of scavenge ports.

9. A direct injection system as set forth in claim 8 wherein the fuel injector is in the path of scavenge flow toward the exhaust port.

10. A direct injection system as set forth in claim 9 wherein the fuel injector is mounted in the cylinder head.

11. A direct injection system as set forth in claim 9 wherein the fuel injector is mounted above the exhaust port.

12. A direct injection system as set forth in claim 9 wherein the fuel injector sprays in a conical pattern downwardly toward the piston.

13. A direct injection system as set forth in claim 9 wherein the fuel injector is mounted in the cylinder head.

14. A direct injection system as set forth in claim 9 wherein the fuel injector is mounted above the exhaust port.

15. A direct injection system as set forth in claim 9 wherein there is provided a pair of scavenge ports on opposite sides of the exhaust port.

16. A direct injection system as set forth in claim 15 wherein the fuel injector is in the path of scavenge flow toward the exhaust port.

17. A direct injection system as set forth in claim 16 wherein the fuel injector is mounted in the cylinder head.

18. A direct injection system as set forth in claim 17 wherein the fuel injector is mounted above the exhaust port.

19. A direct injection system as set forth in claim 15 wherein there is also provided an auxiliary scavenge port diametrically opposite the exhaust port and between the pair of scavenge ports.

20. A direct injection system as set forth in claim 19 wherein the fuel injector is in the path of scavenge flow toward the exhaust port.

21. A direct injection system as set forth in claim 20 wherein the fuel injector is mounted in the cylinder head.

22. A direct injection system as set forth in claim 20 wherein the fuel injector is mounted above the exhaust port.

* * * * *